(12) United States Patent
Saito

(10) Patent No.: US 10,097,730 B2
(45) Date of Patent: *Oct. 9, 2018

(54) COMMUNICATION SYSTEM FOR PERFORMING WIRELESS NEAR FIELD COMMUNICATION WITH RESPECT TO IDENTIFICATION INFORMATION THAT IS USED TO RECEIVE SERVICE FROM SERVICE PROVIDING APPARATUS

(71) Applicant: BROTHER KOGYO KABUSHIKI KAISHA, Nagoya, Aichi (JP)

(72) Inventor: Ken Saito, Tokoname (JP)

(73) Assignee: BROTHER KOGYO KABUSHIKI KAISHA, Nagoya, Aichi (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/635,916

(22) Filed: Jun. 28, 2017

(65) Prior Publication Data

US 2017/0302823 A1 Oct. 19, 2017

(30) Foreign Application Priority Data

Feb. 27, 2015 (JP) ................................. 2015-038040

(51) Int. Cl.
*H04N 1/04* (2006.01)
*H04N 1/44* (2006.01)
*H04N 1/00* (2006.01)

(52) U.S. Cl.
CPC ....... *H04N 1/4433* (2013.01); *H04N 1/00204* (2013.01); *H04N 1/00344* (2013.01);
(Continued)

(58) Field of Classification Search
CPC ........... H04N 1/00244; H04N 1/00344; H04N 1/00411; H04N 1/00307
(Continued)

(56) References Cited

U.S. PATENT DOCUMENTS 9,706,065 B2* 7/2017 Saito .................. H04N 1/00244
2006/0136566 A1 6/2006 Ohara et al.
(Continued)

FOREIGN PATENT DOCUMENTS

JP 2013-522774 A 6/2013

OTHER PUBLICATIONS

English Abstract of WO 2011/115987 A2, dated Sep. 22, 2011.
(Continued)

*Primary Examiner* — Houshang Safaipour
(74) *Attorney, Agent, or Firm* — Scully, Scott, Murphy & Presser, P.C.

(57) ABSTRACT

A communication system includes a portable terminal, an image processing apparatus, and a server. The image processing apparatus transmits service request information to the server, and receives acquisition instruction information from the server. The service request information includes request for a service that a service providing apparatus is configured to provide. The acquisition instruction information includes an instruction to acquire identification information via wireless near field communication. The identification information is used to receive a service that a service providing apparatus provides. The image processing apparatus receives the identification information from the portable terminal via the first near field communication interface and transmits the identification information to the server via the first communication interface.

8 Claims, 15 Drawing Sheets

(52) U.S. Cl.
CPC ............... *H04N 2201/006* (2013.01); *H04N 2201/0094* (2013.01)

(58) Field of Classification Search
USPC .............................................. 358/1.15, 1.14
See application file for complete search history.

(56) References Cited

U.S. PATENT DOCUMENTS

| | | |
|---|---|---|
| 2011/0235085 A1 | 9/2011 | Jazayeri et al. |
| 2011/0299110 A1 | 12/2011 | Jazayeri et al. |
| 2012/0050806 A1 | 3/2012 | Fukuda |
| 2012/0057193 A1 | 3/2012 | Jazayeri et al. |
| 2013/0027726 A1 | 1/2013 | Yamada |
| 2014/0226171 A1 | 8/2014 | Tredoux et al. |
| 2014/0240747 A1 | 8/2014 | Hirano |
| 2014/0268226 A1 | 9/2014 | Yoshida et al. |
| 2014/0313539 A1* | 10/2014 | Kawano ................. G06F 21/44 358/1.14 |
| 2016/0065781 A1 | 3/2016 | Um |
| 2016/0255213 A1 | 9/2016 | Okazawa et al. |
| 2016/0259599 A1 | 9/2016 | Cho |

OTHER PUBLICATIONS

U.S. Appl. No. 15/052,924, filed Feb. 25, 2016.
Notice of Allowance dated Mar. 1, 2017 received in related U.S. Appl. No. 15/052,930.
U.S. Official Action dated Sep. 23, 2016 received in related U.S. Appl. No. 15/052,930.
United States Office Action dated Oct. 19, 2017 received in related U.S. Appl. No. 15/052,924.
Office Action dated Mar. 13, 2018 received from the United States Patent Office in related U.S. Appl. No. 15/052,924.

* cited by examiner

FIG. 4(A)

| CARD ID | PIN |
|---|---|
| ABC | 123 |
| DEF | 456 |
| ... | ... |

FIG. 4(B)

| USER INFORMATION | PIN | MACHINE INFORMATION | COLLECTED DATA | |
|---|---|---|---|---|
| USER A | 123 | MFP-A | DATA 1 | DATA 2 |
| USER B | 456 | MFP-B | DATA 1 | DATA 2 |
| ... | ... | ... | ... | ... |

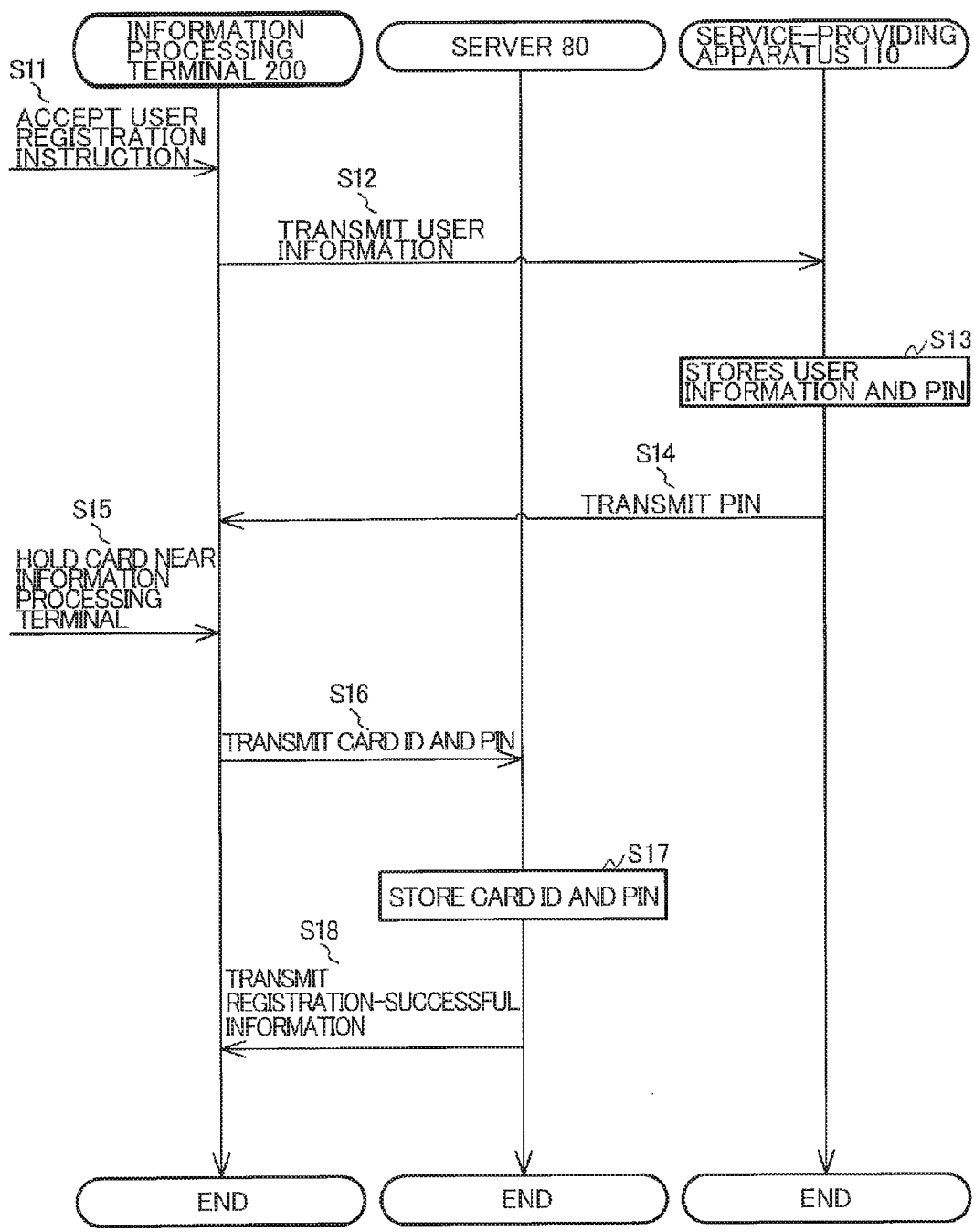

| SERVICE ID | TempID | ACCOUNT INFORMATION |
|---|---|---|
| 001 | ghi | 0x7c2 |
| 002 | klm | 0x18A |
| 002 | xyz | 0x5BD |
| ⋮ | ⋮ | ⋮ |

| SERVICE ID | ACCOUNT ID | CARD ID | ACCOUNT INFO | USER NAME | MACHINE INFO |
|---|---|---|---|---|---|
| 001 | 1 | DEF | 0x7c2 | USER B | abc |
| 002 | 2 | ABC | 0x18A | USER A | zxy |
| 002 | 3 | DEF | 0x5BD | USER B | pqr |
| ⋮ | ⋮ | ⋮ | ⋮ | ⋮ | ⋮ |

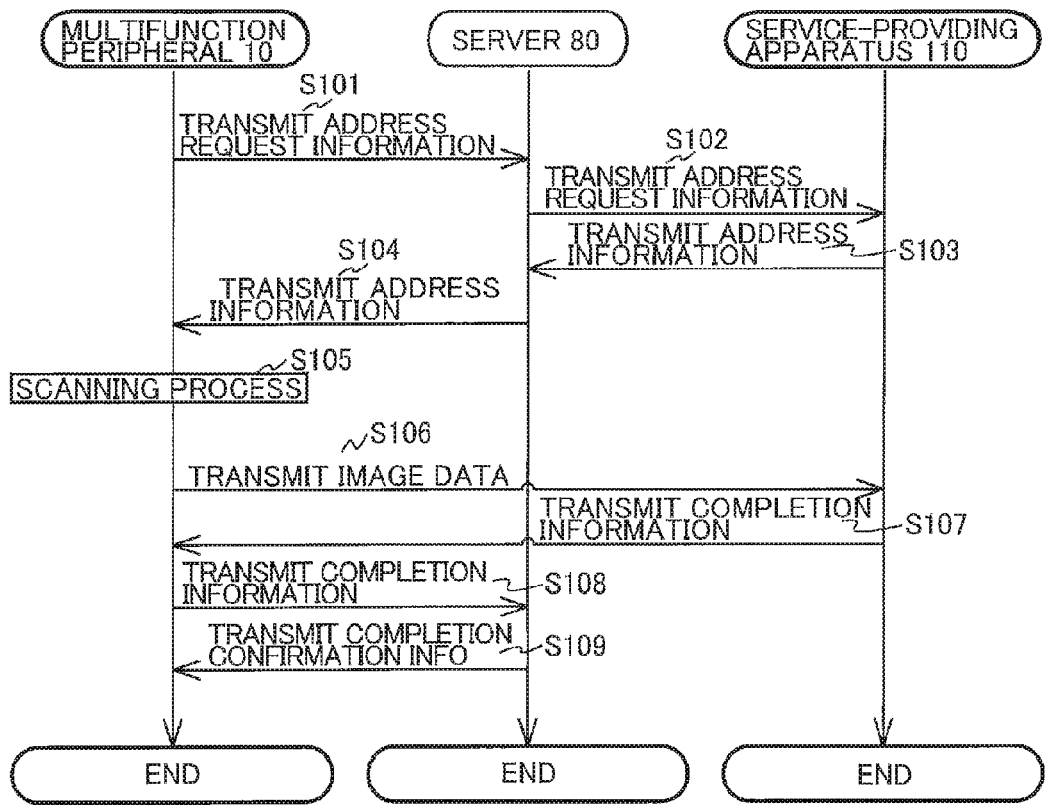
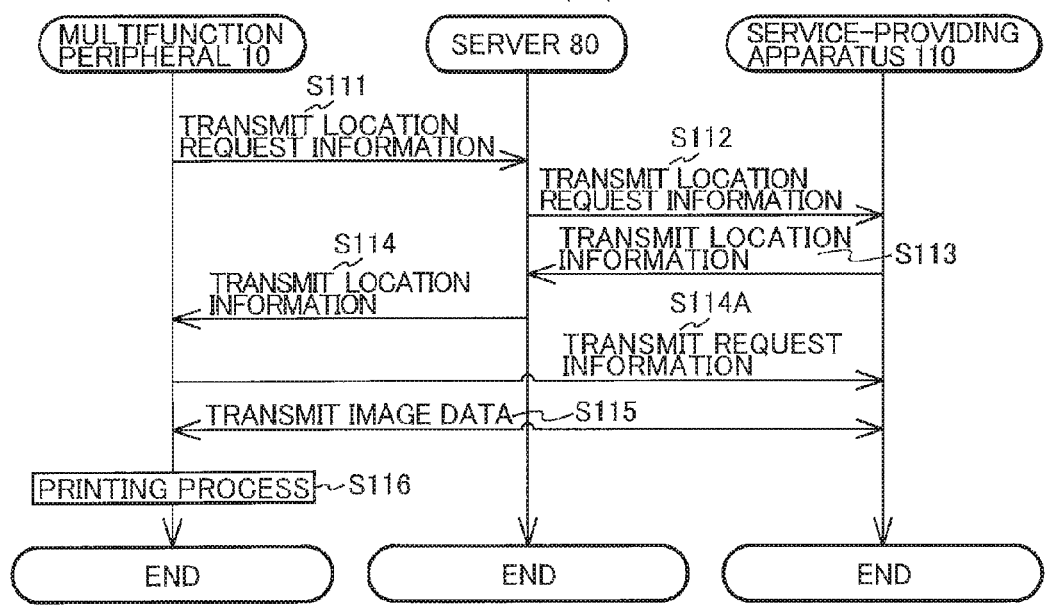

COMMUNICATION SYSTEM FOR PERFORMING WIRELESS NEAR FIELD COMMUNICATION WITH RESPECT TO IDENTIFICATION INFORMATION THAT IS USED TO RECEIVE SERVICE FROM SERVICE PROVIDING APPARATUS

CROSS REFERENCE TO RELATED APPLICATION

This application claims is a continuation application of U.S. application Ser. No. 15/052,930 filed on Feb. 25, 2016, which claims priority from Japanese Patent Application No. 2015-038040 filed Feb. 27, 2015. The entire content of the priority application is incorporated herein by reference.

TECHNICAL FIELD

The present disclosure relates to a communication system for providing services by a service-providing apparatus to an image processing apparatus.

BACKGROUND

A conventional communication system enables a user to access a service-providing apparatus through operations on an image-forming apparatus so that, via the image-forming apparatus, the user can access services provided by the service-providing apparatus. Such services may include: downloading data stored on the service-providing apparatus and printing the data on the image-forming apparatus; uploading data scanned by the image-forming apparatus to the service-providing apparatus; converting the format of data uploaded to the service-providing apparatus on the service-providing apparatus; and uploading data collected by the image-forming apparatus to the service-providing apparatus.

In a conventional system, a user registers an image-forming apparatus on a service-providing apparatus using a personal computer, at which time the service-providing apparatus issues authentication information to the personal computer. By inputting this authentication information into the image-forming apparatus, the user can access services on the service-providing apparatus through the image-forming apparatus.

SUMMARY

However, the conventional system described above does not merely require a procedure for registering the image-forming apparatus on the service-providing apparatus, but also requests the user to perform the action of inputting authentication information displayed on the screen of the personal computer into the image-forming apparatus. Consequently, the user must perform troublesome tasks in order to be able to access the service-providing apparatus using the image-forming apparatus.

In view of the foregoing, it is an object of the present disclosure to provide a communication system that simplifies user actions required for accessing a service-providing apparatus using an image processing apparatus.

In order to attain the above and other objects, the disclosure provides a communication system. The communication system includes a portable terminal, an image processing apparatus, and a server. The image processing apparatus includes an image processor, a first communication interface, a first near field communication interface, and a first controller. The first communication interface is configured to communicate with the server via the Internet. The first near field communication interface is configured to perform wireless near field communication with a portable terminal according to a prescribed protocol. The first controller is configured to: transmit service request information to the server via the first communication interface, the service request information including request for a service provided by a service providing apparatus; receive acquisition instruction information from the server via the first communication interface, the acquisition instruction information including an instruction to acquire identification information via wireless near field communication, the identification information being used to receive the service; receive the identification information from the portable terminal via the first near field communication interface; and transmit the identification information to the server via the first communication interface in response to reception of the identification information from the portable terminal via the first near field communication interface. The portable terminal includes a terminal memory, a second near field communication interface, and a second controller. The second near field communication interface is configured to perform wireless near field communication with the first near field communication interface according to the prescribed protocol. The second controller is configured to transmit the identification information stored in the terminal memory to the first near field communication interface via the second near field communication interface. The server includes a second communication interface, and a third controller. The second communication interface is configured to communicate with the first communication interface via the Internet. The third controller is configured to: receive the service request information from the image processing apparatus via the second communication interface; and transmit the acquisition instruction information to the image processing apparatus via the second communication interface in response to reception of the service request information from the image processing apparatus.

According to another aspects, the disclosure provides a communication system. The communication system includes a portable terminal, an image processing apparatus, and a server. The image processing apparatus includes an image processor, a first communication interface, and a first controller. The image processor is configured to form an image. The first communication interface is configured to perform: indirect communication with the server via an intermediate communication equipment; and direct wireless communication with the portable terminal via no intermediate communication equipment. The first controller is configured to: transmit service request information to the server via the first communication interface through the indirect communication, the service request information including request for a service provided by a service providing apparatus; receive acquisition instruction information from the server via the first communication interface through the indirect communication, the acquisition instruction information including an instruction to acquire identification information via the first communication interface through the wireless direct communication, the identification information being used to receive the service; receive the identification information from the portable terminal via the first communication interface via the wireless direct communication; and transmit the identification information to the server via the first communication interface through the indirect communication in response to reception of the identification information from the portable terminal via the first communication interface through the wireless direct communication. The portable terminal includes a terminal memory, a second communication interface, and a second controller. The second communication interface is configured to perform direct wireless communication with the first communication interface via no intermediate communication equipment. The second controller is configured to transmit the identification information stored in the terminal memory to the image processing apparatus via the second near field communication interface through the wireless direct communication. The server includes a third communication interface, and a third controller. The third communication interface is configured to communicate with the image processing apparatus via the intermediate communication equipment. The third controller is configured to: receive the service request information from the image processing apparatus via the third communication interface; and transmit the acquisition instruction information to the image processing apparatus via the third communication interface in response to reception of the service request information from the image processing apparatus.

According to still another aspects, the disclosure provides a communication system. The communication system includes a portable terminal, an image processing apparatus, and a server. The image processing apparatus includes an image processor, a first communication interface, and a first controller. The image processor is configured to form an image. The first communication interface is configured to perform: indirect communication with the server via an intermediate communication equipment; and direct wireless communication with the portable device via no intermediate communication equipment. The first controller is configured to: transmit service request information to the server via the first communication interface through the indirect communication, the service request information including request for a service provided by a service providing apparatus; receive acquisition instruction information from the server via the first communication interface through the indirect communication, the acquisition instruction information including an instruction to acquire identification information via the first communication interface through the wireless direct communication, the identification information being used to receive the service; receive the identification information from the portable terminal via the first communication interface through the wireless direct communication; determine whether the identification information is received from the portable device via the first communication interface through the wireless direct communication interface in response to reception of the acquisition instruction information from the server; and transmit the identification information to the server via the first communication interface through the indirect communication in response to reception of the identification information from the portable terminal via the first communication interface through the wireless direct communication. The portable terminal includes a terminal memory, a second communication interface, and a second controller. The second communication interface is configured to perform direct wireless communication with the first communication interface via no intermediate communication equipment. The second controller is configured to transmit the identification information stored in the terminal memory to the image processing apparatus via the second communication interface through the wireless direct communication. The server includes a third communication interface and a third controller. The third communication interface is configured to communicate with the first communication interface via the intermediate communication equipment. The third controller is configured to: receive the service request information from the image processing apparatus via the third communication interface; and transmit the acquisition instruction information to the image processing apparatus via the third communication interface in response to reception of the service request information from the image processing apparatus.

According to still another aspects, the disclosure provides an image processing apparatus. The image processing apparatus includes an image processor, a communication interface, a near field communication interface and a controller. The image processor is configured to form an image. The communication interface is configured to communicate with a server via the Internet. The near field communication interface is configured to perform wireless near field communication with a portable terminal according to a prescribed protocol. The controller is configured to: transmit service request information to the server via the communication interface, the service request information including request for a service provided by a service providing apparatus; receive acquisition instruction information from the server via the communication interface, the acquisition instruction information including an instruction to acquire identification information via wireless near field communication, the identification information being used to receive the service; and receive the identification information from the portable terminal via the near field communication unit; and transmit the identification information to the server via the communication interface in response to reception of the identification information from the portable terminal via the near field communication interface.

According to still another aspects, the disclosure provides a server. The server includes a communication interface and a controller. The communication interface is configured to communicate with an image processing apparatus via the Internet. The controller is configured to: receive service request information from the image processing apparatus via the communication interface, the service request information including request for a service provided by a service providing apparatus; and transmit acquisition instruction information to the image processing apparatus via the communication interface in response to reception of the service request information from the image processing apparatus, the acquisition instruction information including an instruction to instruct the image processing apparatus to acquire identification information via wireless near field communication, the identification information being used to receive the service provided by the service providing apparatus.

BRIEF DESCRIPTION OF THE DRAWINGS

The particular features and advantages of the disclosure as well as other objects will become apparent from the following description taken in connection with the accompanying drawings, in which:

FIG. 4(A) is an explanatory diagram illustrating data stored in a program storage area;

FIG. 4(B) is an explanatory diagram illustrating data stored in a service-providing apparatus;

FIG. 5 is a flowchart illustrating a process to register card ID and PIN in the server according to the first embodiment;

FIGS. 8(A) and 8(B) are explanatory diagrams illustrating tables stored in the data storage area;

FIG. 14(A) is a flowchart illustrating a scan-and-upload process;

FIG. 14(B) is a flowchart illustrating a download-and-print process; and

DETAILED DESCRIPTION

Figure 1:
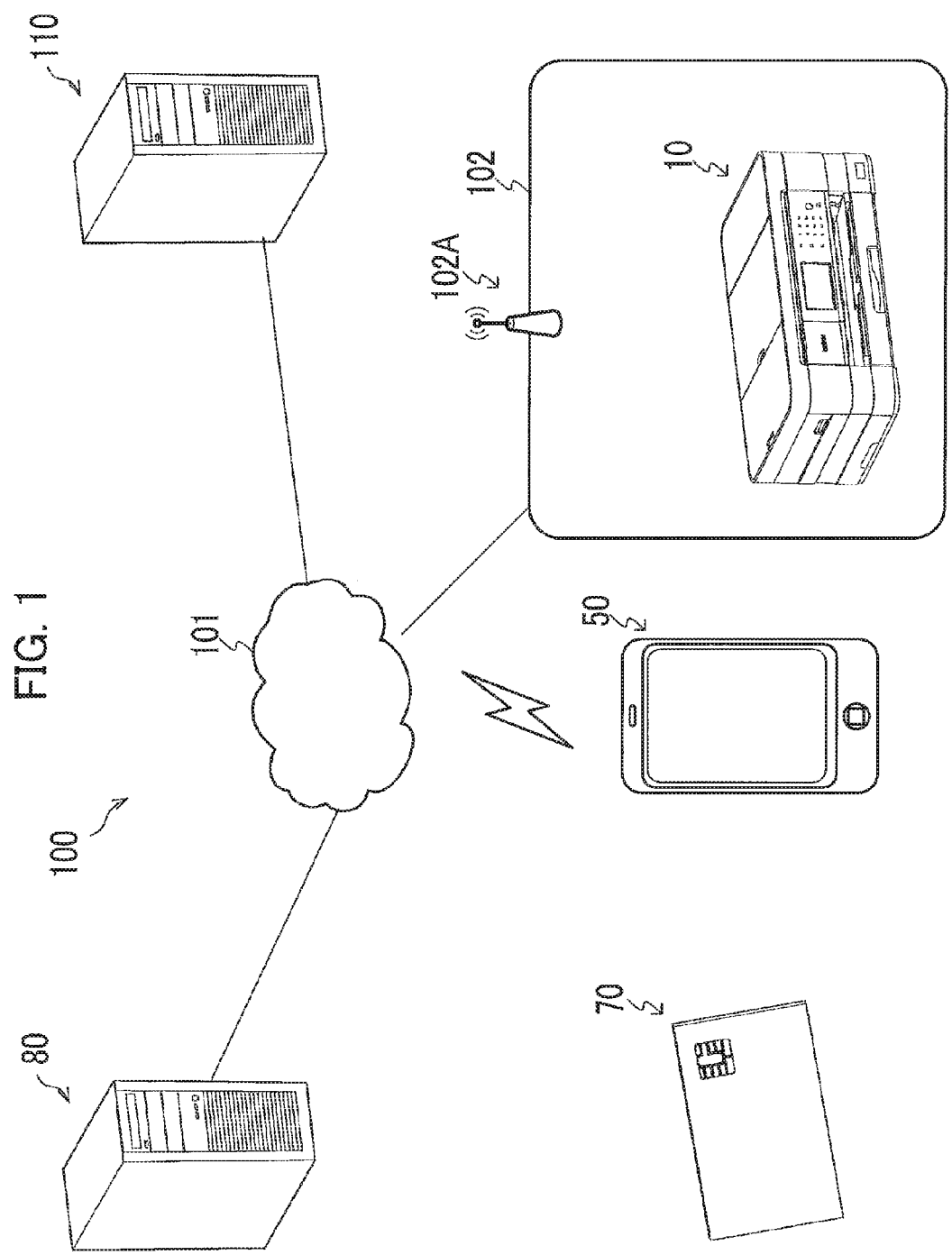
FIG. 1 is a schematic diagram showing a communication system according to a first embodiment.

A communication system according to embodiments will be described while referring to the accompanying drawings wherein like parts and components are designated by the same reference numerals to avoid duplicating description. It would be apparent to those skilled in the art that various changes and modifications may be made therein without departing from the scope of the disclosure. Further, any components and processes described in following first to third embodiments can arbitrary combined.

FIG. 1 is a schematic diagram showing a communication system 100 according to a first embodiment. The communication system 100 shown in FIG. 1 includes a multifunction peripheral 10, a portable terminal 50, a card 70, and a server 80. The communication system 100 may not include at least one of the multifunction peripheral 10, the portable terminal 50, the card 70, and the server 80. The multifunction peripheral 10, the portable terminal 50, and the server 80, and a service-providing apparatus 110 can communicate with each other over a communication network. While there are no particular limitations on the structure of the communication network, the network may be the Internet, a wired local area network (LAN), a wireless LAN, or a combination of these.

The multifunction peripheral 10 is associated with the wireless LAN 102. The wireless LAN 102 is further connected to the Internet 101 via a router or the like (not shown). The portable terminal 50 is connected to the Internet 101 via a base station (not shown). The server 80 and the service-providing apparatus 110 are also connected to the Internet 101. Note that the expression "is associated with the wireless LAN 102" indicates that a device is configured as part of the wireless LAN 102 and is able to communicate with other devices that are also as part of the wireless LAN 102. More specifically, the service set identifier (SSID) of the multifunction peripheral 10 is set to the same SSID as an access point 102A of the wireless LAN 102 and is given the network address assigned to the wireless LAN 102.

The multifunction peripheral 10 can communicate with the server 80 and the service-providing apparatus 110 via the Internet 101 from the access point 102A and the router (not shown). The portable terminal 50 can communicate wirelessly with the server 80 and the service-providing apparatus 110 via the Internet 101 from the base station (not shown). Communication via the Internet 101 is an example of indirect communication, which denotes communication with an external device via communication equipment. The multifunction peripheral 10 and the portable terminal 50 can communicate wirelessly with each other without going through the Internet 101. Communication that does not pass through the Internet 101 is an example of direct communication, which is wireless communication with an external device that does not pass through communication equipment. The router (not shown) and the base station (not shown) are examples of this communication equipment.

Note that wireless communication is not limited to the action of communicating wirelessly throughout the entire communication section. For example, the expression "the multifunction peripheral 10 wirelessly transmits or wirelessly receives information or data via the access point 102A" simply necessitates that wireless communication is implemented in any communication section between the multifunction peripheral 10 and the access point 102A. This holds true for the portable terminal 50, as well.

Multifunction Peripheral

Figure 2A:
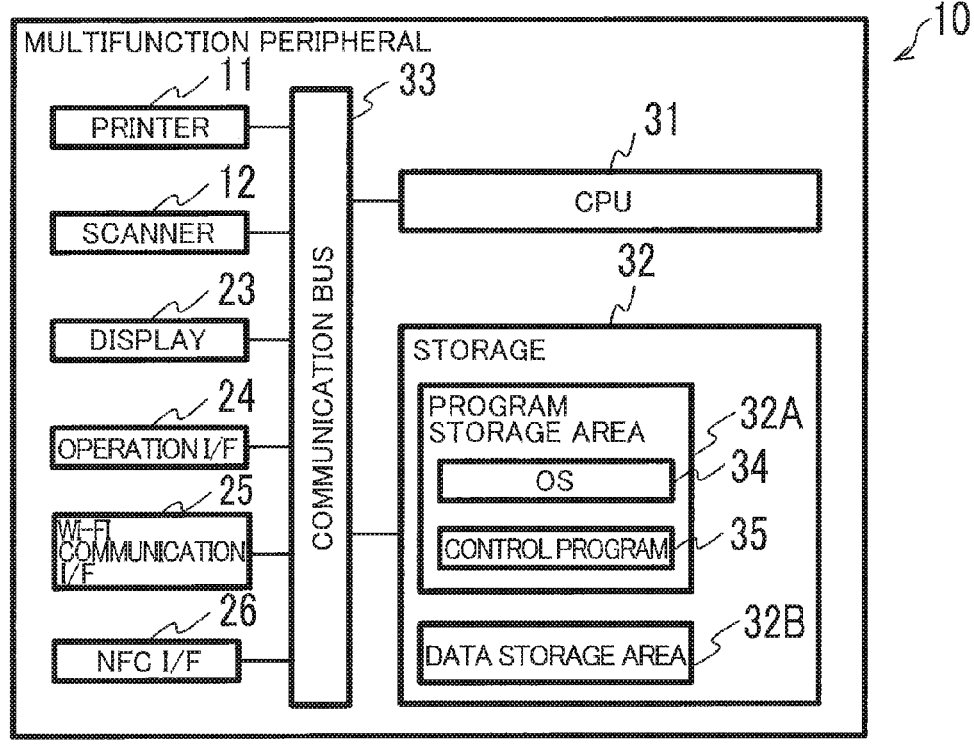
FIG. 2(A) is a block diagram illustrating an electrical configuration of a multifunction peripheral according to the first embodiment.

As shown in FIG. 2(A), the multifunction peripheral 10 primarily includes a printer 11, a scanner 12, a display 23, an operation interface 24, a Wi-Fi (registered trademark of the Wi-Fi Alliance) communication interface 25, an NFC (Near Field Communication) unit 26, a CPU 31, and a storage 32, all of which are interconnected via a communication bus 33. The multifunction peripheral 10 is an example of the image processing apparatus. The printer 11 and the scanning unit 12 are examples of the image processors that form images on printing media. The Wi-Fi communication interface 25 is an example of the communication interface. The NFC interface 26 is an example of the near field communication interface.

Printer, Scanner, and Fax Unit

The printer 11 executes a recording process to record an image specified by image data on recording paper as an example of the sheet. The method of recording employed by the printer 11 may be any well-known method, including an inkjet method and electrophotographic method. The scanner 12 executes a scanning process to read an image recorded on a recording paper and to generate image data. The multifunction peripheral 10 may include a facsimile function for transmitting and receiving facsimile data and a copying function for reading an image recorded on recording paper and recording this image on another sheet of recording paper.

Display

The display 23 includes a display screen for displaying various information. The display 23 may be configured of a liquid crystal display (LCD) or an organic electro-luminescence display (organic EL display), for example.

Operation Interface

The operation interface 24 receives operations from the user when the user selects objects displayed on the display screen of the display 23. More specifically, the operation interface 24 has buttons and outputs various operating signals to the CPU 31 corresponding to buttons that have been pressed. The operation interface 24 may also include a film-like touch sensor laid over the display screen of the display 23. In other words, the display 23 may be configured as a touchscreen display.

Note that the term "object" used in this description denotes an image that the user can select by operating the operation interface 24. An example of an object is a character string displayed on the display 23. The user may highlight an object by pressing directional keys on the operation interface 24 and may select the highlighted object by pressing a "Select" button of the operation interface 24. Other examples of objects when the operation interface 24 is configured as a touchscreen are icons, buttons, and links displayed on the display 23. The user may select an object displayed by touching the touchscreen at the object's displayed position.

The operation interface 24 in the embodiment is implemented as a touchscreen that receives operations in the form of the user touching the display screen of the display 23. The operation interface 24 outputs position information indicating positions on the display screen that the user touched. The position information can be expressed as coordinates (x, y) in an xy plane, where the upper left corner of the display screen serves as the point of origin, the positive X-axis extends rightward from the origin, and the positive Y-axis extends downward from the origin. The touch sensors of the operation interface 24 may be configured using any well-known method, including electrostatic capacitive method or an electrically resistive film method.

Note that the term "touch" in the following descriptions in general includes any operation for contacting the display screen with an input medium. Examples of touching include a tap operation in which the touching input medium is separated from the display screen within a prescribed time period; a long touch operation in which the touching input medium remains static on the display screen; a slide operation in which the input medium is slid over the display screen; a flick operating in which the input medium is slid over the display screen at an acceleration exceeding a threshold; a pinch-in operation in which two input media touching different positions on the display screen are slid closer to each other; and a pinch-out operation in which two input media touching different positions on the display screen are slid away from each other.

Further, the action of bringing the input medium to a position only slightly separated from the display screen while not touching the same may also fall under the concept of "touch" described above. Further, the input medium may be the user's finger, a stylus, or the like.

Wi-Fi Communication Interface

The Wi-Fi communication interface 25 is an interface for implementing wireless communications with external devices. More specifically, the Wi-Fi communication interface 25 can communicate indirectly with the portable terminal 50, the server 80, and the service-providing apparatus 110 and can communicate directly with the portable terminal 50. The Wi-Fi communication interface 25 uses a communication method that conforms to the IEEE 802.11 standard, for example. In this case, indirect communication denotes communication using an infrastructure mode, while direct communication denotes communication using an ad-hoc mode or Wi-Fi Direct.

NFC Interface

The NFC interface 26 is an interface for implementing wireless communications according to a wireless near field protocol compliant with the NFC Forum Device Requirements. Wireless communication with an external device through the NFC interface 26 is an example of direct communication or wireless near field communication. The NFC interface 26 is equipped with a chip (integrated circuit) having a storage for storing information to be transmitted to or received from an external device. The NFC Forum Device Requirements are an example of the wireless near field communication protocol. In the embodiment, the NFC interface 26 performs wireless near field communication (or near field radio communication) according to a wireless near field protocol compliant with the NFC Forum Device Requirements. However, the wireless near field communication may be performed according to other wireless near field protocol. That is, the NFC interface 26 (56 and 73) may perform the wireless near field communication according to a wireless near field protocol other than the NFC Forum Device Requirements. Another example of a wireless near field protocol is TransferJet (a registered trademark of the TransferJet Consortium).

In the following descriptions, devices capable of communicating using a method compliant with the NFC Forum Device Requirements will be called "NFC-compliant devices, while communications according to a method compliant with the NFC Forum Device Requirements will be called "NFC." Thus, the multifunction peripheral 10, the portable terminal 50, and the card 70 are examples of NFC-compliant devices. The multifunction peripheral 10 and the portable terminal 50 can operate in one of the operating modes: peer-to-peer (P2P) mode, reader mode, writer mode, and card emulation (CE) mode. In the embodiment, the reader mode and writer mode will be expressed together as the "R/W mode."

The P2P mode is used for implementing bi-directional communications between a pair of NFC-compliant devices. Both Type A NFC-compliant devices defined under ISO/IEC 1443 established by the NFC Forum and Type F NFC-compliant devices defined under ISO/IEC 18092 can operate in the P2P mode. However, Type B NFC-compliant devices defined under ISO/IEC 1443 cannot operate in P2P mode.

The R/W and CE modes serve to implement unidirectional communications between a pair of NFC-compliant devices. In the CE mode, an NFC-compliant device emulates a card placed near the device according to the format established by the NFC Forum. Note that the card 70 operates as a card conforming to the NFC Forum Device Requirements. In this embodiment, NFC-compliant devices that operate in the CE mode or operate as cards conforming to the NFC Forum Device Requirements will be treated as operating under the CE mode for convenience. All of the Type A, Type F, and Type B NFC-compliant devices can operate in CE mode. Reader mode allows information or the like to be read from an NFC-compliant device operating in the CE mode. Writer mode allows various information to be written to an NFC-compliant devices operating in CE mode.

The description in the first embodiment will focus on cases in which the multifunction peripheral 10 operates in the R/W mode and the card 70 operates in the CE mode.

Thus, the multifunction peripheral 10 operating in the R/W mode can read information and the like from the card 70 operating in the CE mode, and can write information and the like to the card 70. However, the present disclosure is not limited to this configuration. For example, the multifunction peripheral 10 may operate in the CE mode while the card 70 operates in the R/W mode, or both the multifunction peripheral 10 and card 70 may operate in the P2P mode. The same is true when the multifunction peripheral 10 and the portable terminal 50 perform NFC communications.

In the first embodiment, the NFC interface 26 of the multifunction peripheral 10 executes a polling operation. The polling operation is the action of periodically outputting a polling signal at prescribed intervals while monitoring responses to the polling signals in the form of a response signal. In the meantime, an NFC interface 73 (described later) on the card 70 according to the first embodiment executes a listening operation. The listening operation is the action of monitoring for polling signals and outputting a response signal when a polling signal is received.

By placing the card 70 in proximity to the multifunction peripheral 10, the NFC interface 73 of the card 70 can receive the polling signal outputted from the NFC interface 26 in the multifunction peripheral 10, causing the NFC interface 73 to output a response signal. When the NFC interface 26 receives the response signal from the NFC interface 73, a communication link according to the NFC method (hereinafter called an "NFC link") is established between the multifunction peripheral 10 and the card 70 through a prescribed procedure that conforms to the NFC standard. Thereafter, the multifunction peripheral 10 and the card 70 can transmit and receive information and the like via this NFC link.

However, the relationship between the multifunction peripheral 10 and the card 70 is not limited to the above example. The NFC interface 26 of the multifunction peripheral 10 may instead execute a listening operation while the NFC interface 73 of the card 70 implements a polling operation. In this case, when the card 70 is brought near the multifunction peripheral 10, the NFC interface 26 of the multifunction peripheral 10 receives the polling signal outputted from the NFC interface 73 of the card 70, causing the NFC interface 26 to output a response signal. An NFC link is established between the multifunction peripheral 10 and the card 70 when the NFC interface 73 receives this response signal.

CPU

The CPU (central processing unit) 31 functions to control all operations of the multifunction peripheral 10. The CPU 31 acquires various programs described later from the storage 32 and executes the programs on the basis of various information outputted from the operation interface 24 and various information and the like acquired from external devices via the communication interface 25. The CPU 31 and the storage 32 constitute an example of the controller.

Storage

The storage 32 has a program storage area 32A, and a data storage area 32B. The program storage area 32A stores an operating system (OS) 34, and a control program 35. The OS 34 and the control program 35 are programs built in binary format. The control program 35 may be a single program or an aggregate of programs. The data storage area 32B stores data or information required to execute the control program 35. The storage 32 is an example of a device storage.

Note that the terms "data" and "information" in the following descriptions used share aspects of being bits or bit strings that computers can handle. The computer treats "data" without considering the significance of its individual bits. In the case of "information," on the other hand, the computer's operations branch based on the significance of the individual bits. Additionally, an "instruction" is a control signal prompting the destination device to perform the next operation. An instruction may include information and may itself possess the properties of information.

Further, data and information are treated as the same data and information even when the format (such as a text format, binary format, or flag format) is modified for different computers, provided that the computers can recognize the same content. For example, information specifying the number "two" may be stored in one computer as information in the text format for the ASCII code "0x32", and may be stored in a different computer as information in the binary format for the binary notation "10".

However, the distinction between data and information is not strictly enforced; exceptions to the rule may be allowed. For example, data may be temporarily treated as information, while information may be temporarily treated as data. Further, certain bits or bit strings may be treated as data on one device and treated as information on another. Further, information may be extracted from data, and data may be extracted from information.

The storage 32 is configured of random access memory (RAM), read-only memory (ROM), electrically erasable programmable read-only memory (EEPROM), a hard disk drive (HDD), a buffer provided in the CPU 31, or a combination of these, for example.

Note that the storage 32 may be any storage medium that can be read by a computer. A computer-readable storage medium is a non-transitory medium. In addition to the above examples, non-transitory media include CD-ROM and DVD-ROM. A non-transitory medium is also a tangible medium. On the other hand, electric signals that convey programs downloaded from a server or the like on the Internet are a computer-readable signal medium, which is one type of computer-readable medium but is not considered a non-transitory computer-readable storage medium.

The CPU 31 executes programs stored in the program storage area 32A. However, in the following descriptions may omit the CPU 31 when describing operations of the programs. In other words, the phrasing "Program A executes Process A" in the following description may be used to signify that "the CPU 31 executes Process A described in Program A." The same holds true for programs executed on the server 80 and the portable terminal 50 described later.

The OS 34 is the underlying software that provides an application program interface (API) for controlling the hardware constituting the multifunction peripheral 10, including the printer 11, the scanner 12, the display 23, the operation interface 24, the Wi-Fi communication interface 25, and the NFC interface 26. The programs described above control the hardware of the multifunction peripheral 10 by calling the API provided in the OS 34. However, the role of the OS 34 will not be included in the following descriptions of operations of these programs. Thus, the phrase "Program B controls Hardware C" in the following description may be used to signify that "Program B controls Hardware C via the API of the OS 34." This usage in the following description will also apply to the server 80 and the portable terminal 50 described later.

Portable Terminal

Figure 2B:
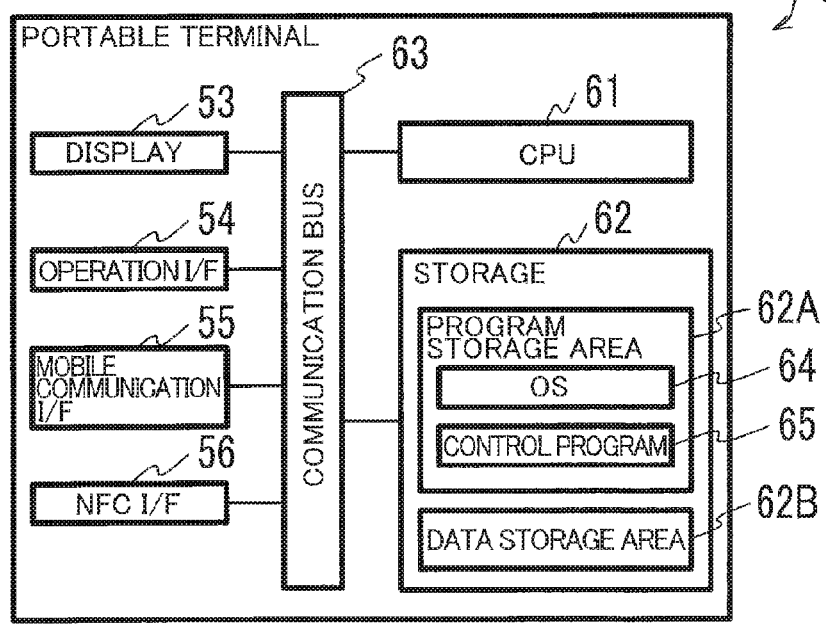
FIG. 2(B) is a block diagram illustrating an electrical configuration of a portable terminal according to the first embodiment.

As shown in FIG. 2(B), the portable terminal 50 primarily includes a display 53, an operation interface 54, a mobile communication interface 55, an NFC interface 56, a CPU 61, and a storage 62, all of which are interconnected via a communication bus 63. As with the storage 32 of the multifunction peripheral 10, the storage 62 also includes a program storage area 62A and a data storage area 62B, while the program storage area 62A stores an OS 64 and a control program 65. The mobile communication interface 55 is an example of the communication interface. The NFC interface 56 is an example of the near field communication interface. The CPU 61 and the storage 62 constitute an example of the terminal controller. The storage 62 is an example of the terminal storage. The display 53, the operation interface 54, the NFC interface 56, the CPU 61, the storage 62, and the communication bus 63 in the portable terminal 50 are equivalent to the display 23, the operation interface 24, the NFC interface 26, the CPU 31, the storage 32, and the communication bus 33 in the multifunction peripheral 10 and, hence, a detailed description of these components will not be repeated.

The mobile communication interface 55 is an interface for connecting to a mobile communication network (not shown) provided by a telecommunications carrier. The mobile communication network (not shown) is connected to the Internet 101. The mobile communication interface 55 implements wireless communications conforming to the W-CDMA (Wideband Code Division Multiple Access), CDMA 2000, or LTE (Long Term Evolution) communication standard, for example. The portable terminal 50 may be provided with a Wi-Fi communication interface in addition to or instead of the mobile communication interface 55. The function of the Wi-Fi communication interface provided in the portable terminal 50 is identical to that of the Wi-Fi communication interface 25 provided in the multifunction peripheral 10.

Card

Figure 3A:
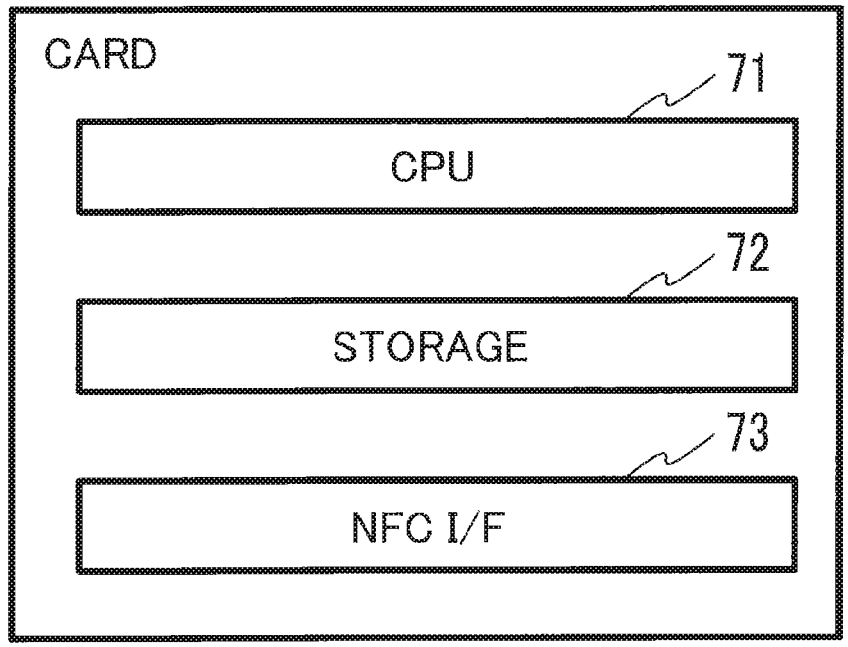
FIG. 3(A) is a block diagram illustrating an electrical configuration of a card according to the first embodiment.

As shown in FIG. 3(A), the card 70 includes a CPU 71, a storage 72, and an NFC interface 73. The storage 72 stores a card ID assigned to the card 70. The card ID is an example of identification information. The identification information is used to receive the service. Since the CPU 71, the storage 72, and the NFC interface 73 in the card 70 are respectively equivalent to the CPU 31, the storage 32, and the NFC interface 26 in the multifunction peripheral 10, a detailed description of these components will not be repeated. The CPU 71, the storage 72, and the NFC interface 73 are mounted in an integrated circuit, for example. The card 70 is another example of a portable terminal.

Server

Figure 3B:
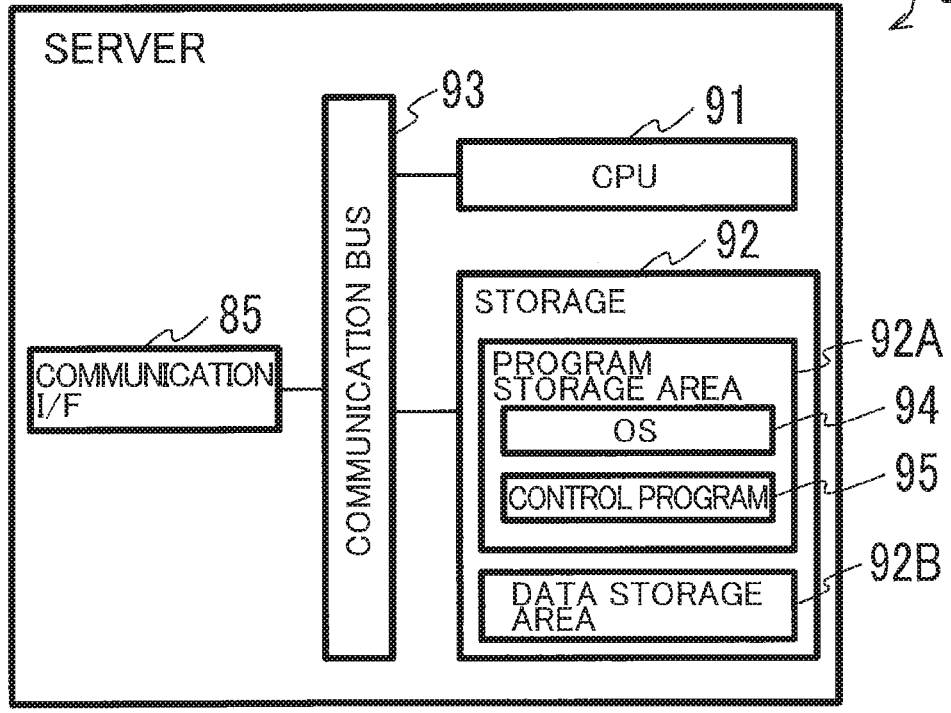
FIG. 3(B) is a block diagram illustrating an electrical configuration of a server according to the first embodiment.

As shown in FIG. 3(B), the server 80 primarily includes a communication interface 85, a CPU 91, and a storage 92, all of which components are interconnected via a communication bus 93. The storage 92 further includes a program storage area 92A and a data storage area 92B, while the program storage area 92A stores an OS 94 and a control program 95. The CPU 91 and storage 92 constitute an example of the server controller. The storage 92 is an example of a server storage. The communication interface 85, the CPU 91, the storage 92, and the communication bus 93 in the server 80 are respectively equivalent to the Wi-Fi communication interface 25, the CPU 31, the storage 32, and the communication bus 33 in the multifunction peripheral 10 and, hence, a description of these components will not be repeated.

As shown in FIG. 4(A), the data storage area 92B can store card IDs and personal identification numbers (PINs) associated with these card IDs. A PIN is an example of authentication information indicating whether the user of the card is authorized to access services provided by the service-providing apparatus 110. Hereinafter, the card IDs and PINs stored in association with each other in the data storage area 92B will be called "card ID information."

Service-Providing Apparatus

The service-providing apparatus 110 is a device that provides services to the multifunction peripheral 10. The service-providing apparatus 110 according to the first embodiment provides a status management service for managing the statuses of the multifunction peripheral 10. Through the status management service, the service-providing apparatus 110 receives information from the multifunction peripheral 10 indicating the status of the multifunction peripheral 10 (for example, information specifying a page count and information specifying remaining amounts of ink), manages this information, and transmits various notifications to the multifunction peripheral 10 that are relevant for the status of the multifunction peripheral 10 indicated by the information. The service-providing apparatus 110 may also provide a service for storing uploaded data, a service for downloading stored data, and a service for converting the format of data, for example.

As shown in FIG. 4(B), the service-providing apparatus 110 can correlate user information with a PIN, machine information, and collected data and store this correlated information. Here, user information is information identifying the user that possesses the card 70. Machine information may be a serial number that uniquely identifies the multifunction peripheral 10, for example. Machine information is an example of device identification information identifying the multifunction peripheral 10. Collected data is data collected by the multifunction peripheral 10. Collected data may be data specifying amounts of consumed ink or toner in the multifunction peripheral 10 or information indicating the number of sheets of recording paper on which images have been recorded in recording processes executed by the multifunction peripheral 10. That is, the collected data may concern the multifunction peripheral 10, or may indicate states of the multifunction peripheral 10. The collected data is collected from the multifunction peripheral 10.

Collaborative Operations with the Server

The multifunction peripheral 10 can perform collaborative operations with the server 80, i.e., operations implemented through collaboration with the server 80. A collaborative operation begins when the multifunction peripheral 10 receives a start instruction for a collaborative operation from the user via the operation interface 24. At the beginning of this collaborative operation, the control program 35 stores collaboration information in the data storage area 32B indicating that a collaborative operation is in progress. For convenience in the following description, the state in which collaboration information is stored in the data storage area 32B, that is, the state in which the multifunction peripheral 10 is performing a collaborative operation with the server 80, will be called the collaborative-operating state. The state in which collaboration information is not stored in the data storage area 32B, i.e., the state of the multifunction peripheral 10 when not in a collaborative-operating state will be called a non-collaborative-operating state.

Note that collaboration information is not stored in the data storage area 32B when the power to the multifunction peripheral 10 is turned on. In other words, the multifunction peripheral 10 is in the non-collaborative-operating state immediately after the power is turned on. When the power to the multifunction peripheral 10 is turned on, the control program 35 displays a standby screen on the display 23. Information used for displaying the standby screen is not information received from the server 80 through the collaborative operation. A collaborative operation icon is displayed in the standby screen in order to receive a start instruction from the user for initiating the collaborative operation. When the control program 35 receives via the operation interface 24 a user operation in the form of tapping the display 23 at a position corresponding to the collaborative operation icon, the control program 35 stores the collaboration information in the data storage area 32B and transmits collaboration start information to the server 80 via the Wi-Fi communication interface 25 as an HTTP request.

When receiving collaboration start information from the multifunction peripheral 10, the server 80 transmits instruction information to the multifunction peripheral 10 via the communication interface 85 as a response in an HTTP communication. The instruction information includes at least process information specifying the process to be executed on the multifunction peripheral 10; and a return uniform resource locator (return URL), i.e., the URL for the server 80, to which the results of the process are to be returned.

When receiving the instruction information from the server 80, the multifunction peripheral 10 interprets this instruction information and executes a process based on the interpretation results. The multifunction peripheral 10 then transmits return information including results information acquired by executing the process, and identification information that was included in the instruction information received from the server 80 to the return address specified by the return URL included in the instruction information as an HTTP request.

When receiving the return information from the multifunction peripheral 10, the server 80 interprets this return information. The server 80 identifies what return URL was used to transmit the return information. Next, the server 80 selects one of a plurality of templates for instruction information that corresponds to the identified return URL. The server 80 further executes a process to acquire content information to be included in next instruction information based on the results information included in the return information. The server 80 then creates instruction information including the acquired content information by editing the selected template. Next, the server 80 transmits this instruction information to the multifunction peripheral 10 as an HTTP response.

When receiving this new instruction information from the server 80, the multifunction peripheral 10 executes a process based on process information included in the instruction information. The multifunction peripheral 10 then transmits new return information to the server 80 as an HTTP request. The server 80 executes a process based on the new return information and once again transmits new instruction information to the multifunction peripheral 10. In this way, a collaborative operation is implemented with the multifunction peripheral 10 first transmitting collaboration start information to the server 80, and the server 80 and the multifunction peripheral 10 repeatedly transmitting instruction information and return information to each other.

When the multifunction peripheral 10 is in the collaborative-operating state, the control program 35 determines whether the multifunction peripheral 10 has been continuously idle for a prescribed time interval in which no operations have been inputted via the operation interface 24. If the multifunction peripheral 10 has been continuously idle for this prescribed time interval, the control program 35 deletes the collaboration information from the data storage area 32B and once again displays the standby screen on the display 23. In other words, the multifunction peripheral 10 returns to the non-collaborative-operating state. Further, when the multifunction peripheral 10 is in the collaborative-operating state, the control program 35 determines whether a specific key (for example, a key instructing the multifunction peripheral 10 to return to the standby screen) has been pressed on the operation interface 24. If the control program 35 determines that the specific key has been pressed, the control program 35 deletes the collaboration information from the data storage area 32B and displays the standby screen on the display 23. In other words, the multifunction peripheral 10 returns to the non-collaborative-operating state.

The instruction information may by an XML (Extensible Markup Language) file that includes at least one of display information specifying the content of the screen to be displayed on the display 23 (text and icons to be displayed, for example); acquiring means information specifying the means for acquiring (or receiving) operations or information (the operation interface 24, the Wi-Fi communication interface 25, or the NFC interface 26, for example); image-forming means information specifying the means for forming images (the printer 11 or the scanner 12, for example); and transmission instruction information instructing the transmission of information by HTTP communications. The display information, the acquiring means information, the image-forming means information, and the transmission instruction information are all examples of process information.

When receiving instruction information, the control program 35 of the multifunction peripheral 10 interprets information included in the instruction information. The control program 35 displays a screen on the display 23 of the multifunction peripheral 10 on the basis of the display information included in the instruction information. The control program 35 enables the information-acquiring means specified in the acquiring means information included in the instruction information. For example, the control program 35 may set the NFC interface 26 to a state capable of communicating via an NFC link. Alternatively, the control program 35 may display an icon on the display 23 for accepting a tap operation. In this way, the control program 35 can accept operations or acquire information via the enabled information-acquiring means. The control program 35 disables the information-acquiring means in conformance with a definition in the instruction information after transmitting information acquired according to the instruction information to the server 80. Alternatively, the control program 35 disables the information-acquiring means according to the definition in the instruction information after acquiring information defined in this instruction information.

The control program 35 controls the image-forming means specified in the image-forming means information included in the instruction information to execute an image-forming process. The transmission instruction information includes a return URL specifying the destination for returning information, and information-specifying information specifying what information is being transmitted. The control program 35 transmits the information specified by the information-specifying information to the return destination specified by the return URL according to HTTP communications. Further, in addition to the display information, the instruction information may also include a serial number for the display information. In this case, the control program 35 may determine what serial number is included in the instruction information and may identify the information-acquiring means that is associated with this serial number. The control program 35 accepts operations or acquires information via the identified information-acquiring means.

Note that a plurality of return URLs may be included in a single set of instruction information. A single set of instruction information may also include a plurality of sets of process information and a plurality of return URLs corresponding respectively to the plurality of sets of process information. The multifunction peripheral 10 can also access services provided by the service-providing apparatus 110 through a collaborative operation. This will be described later in greater detail with reference to FIGS. 14(A)-15.

Note for convenience in the following descriptions, the expression "the content of a screen is specified by the display information" may be restated as "the display information defines the content of the screen." Similarly, the expression "the information-acquiring means is specified by the acquiring means information" may be restated as "the acquiring means information defines the information-acquiring means." Similarly, the expression "the image-forming means is specified by the image-forming means information" may be restated as "the image-forming means information defines the image-forming means." Similarly, the expression "the transmission of information is specified by the transmission instruction information" may be restated as "the transmission instruction information defines the transmission of information."

Control of the NFC Interface in a Collaborative Operation

The control program 35 can set the NFC interface 26 to a reception-enabled state in which the NFC interface 26 can receive information through wireless NFC (hereinafter called "direct wireless reception"); a reception-disabled state in which the NFC interface 26 cannot perform direct wireless reception; a transmission-enabled state in which the NFC interface 26 can transmit information according to wireless NFC (hereinafter called "direct wireless transmission"); and a transmission-disabled state in which the NFC interface 26 cannot perform direct wireless transmission.

In the reception-enabled state, the NFC interface 26 establishes an NFC link and is able to receive information transmitted via this NFC link. In other words, the CPU 31 sets the multifunction peripheral 10 to the reception-enabled state and in the reception-enabled state the CPU 31 can recognize information from the portable terminal via the NFC interface 26. In the reception-disabled state, the NFC interface 26 either has not established an NFC link or has established an NFC link but does not receive information via this established link. In other words, the CPU 31 sets the multifunction peripheral 10 to the reception-disabled state and in the reception-disabled state the CPU 31 cannot recognize information from the portable terminal via the NFC interface 26. In the transmission-enabled state, the NFC interface 26 establishes an NFC link and is able to transmit information via the NFC link. In other words, the CPU 31 sets the multifunction peripheral 10 to the transmission-enabled state and in the reception-enabled state the CPU 31 can transmit information to the portable terminal via the NFC interface 26. In a transmission-disabled state, the NFC interface 26 either has not established an NFC link or has established an NFC link but does not transmit information via this established link. In other words, the CPU 31 sets the multifunction peripheral 10 to the transmission-disabled state and in the transmission-disabled state the CPU 31 cannot transmit information to the portable terminal via the NFC interface 26.

The control program 35 may set the NFC interface 26 to the reception-enabled state by inputting a parameter into the NFC interface 26 indicating that the NFC interface 26 is permitted to establish an NFC link. The control program 35 may set the NFC interface 26 to the reception-enabled state by powering on the NFC interface 26 and inputting parameters into the NFC interface 26 indicating that the NFC interface 26 is permitted to establish an NFC link and indicating that the NFC interface 26 is permitted to receive information transmitted via the NFC link. In the first embodiment, the NFC interface 26 executes a polling operation when a parameter is inputted into the NFC interface 26 indicating that the NFC interface 26 is permitted to establish an NFC link.

Note that if at least one of the parameters is already stored in the NFC interface 26, the control program 35 may omit the operation of inputting that parameter after powering on the NFC interface 26. Further, if the power to the NFC interface 26 is already on or if the NFC interface 26 is configured to automatically power on when establishing an NFC link, the control program 35 may omit the operation of powering on the NFC interface 26.

The control program 35 may set the NFC interface 26 to the transmission-enabled state by powering on the NFC interface 26 and inputting parameters into the NFC interface 26 indicating that the NFC interface 26 is permitted to establish an NFC link and that the NFC interface 26 is permitted to transmit information via the NFC link. Note that if at least one of the parameters is already stored in the NFC interface 26, the control program 35 may omit the operation of inputting that parameter after powering on the NFC interface 26. Further, if the NFC interface 26 is already powered on or if the NFC interface 26 is configured to power on automatically when establishing an NFC link, the CPU 31 may omit the operation of powering on the NFC interface 26.

The control program 35 may set the NFC interface 26 to the reception-disabled state and the transmission-disabled state by powering off the NFC interface 26. The control program 35 may set the NFC interface 26 to the reception-disabled state and the transmission-disabled state by inputting a parameter into the NFC interface 26 indicating that the NFC interface 26 is not permitted to establish an NFC link. In the first embodiment, the NFC interface 26 is controlled to halt the polling operation so as not to establish an NFC link. Further, the control program 35 may set the NFC interface 26 to the reception-disabled state by inputting a parameter into the NFC interface 26 indicating that the NFC interface 26 is not permitted to receive information transmitted via the NFC link. The control program 35 may also set the NFC interface 26 to the transmission-disabled state by inputting a parameter into the NFC interface 26 indicating that the NFC interface 26 is not permitted to transmit information over the NFC link.

If the control program 35 receives ID information and print data via the Wi-Fi communication interface 25 when a parameter has been stored in the data storage area 32B for enabling the secure print function of the multifunction peripheral 10, the control program 35 does not execute a printing process on the print data. In this case, the control program 35 correlates the received ID information with the print data and stores the correlated ID information and print data in the data storage area 32B. Further, if the control program 35 receives ID information via the NFC interface 26, the control program 35 determines whether the ID information is stored in the data storage area 32B. If this ID information is stored in the data storage area 32B, the control program 35 reads the print data associated with the ID information from the data storage area 32B and executes a printing process on this print data.

Further, if the control program 35 receives an SSID and a print instruction for print data via the NFC interface 26 when a parameter is stored in the data storage area 32B enabling the mobile print function of the multifunction peripheral 10, the control program 35 establishes a Wi-Fi connection based on the SSID. Next, the control program 35 receives print data specified by the print instruction through a Wi-Fi transmission and performs a printing process on this print data.

Further, if the control program 35 receives instruction information from the server 80 that includes acquiring means information specifying the NFC interface 26 when the multifunction peripheral 10 is in the collaborative-operating state, the control program 35 transmits information acquired from an NFC device via the NFC interface 26 to the server 80. Hence, when the control program 35 acquires information from an NFC device via the NFC interface 26 after having received instruction information from the server 80 that includes acquiring means information specifying the NFC interface 26, the control program 35 may be unable to determine whether to use the secure print function or the mobile print function on the acquired information and whether to transmit the acquired information to the server 80 for use in a collaborative operation.

Therefore, the control program 35 according to the embodiment determines whether collaboration information is stored in the data storage area 32B. The control program 35 sets the NFC interface 26 to the reception-enabled state when collaboration information is not stored in the data storage area 32B. Next, if a parameter enabling either the secure print function or the mobile print function has been stored in the data storage area 32B, the control program 35 executes the corresponding secure print function or mobile print function on the data acquired from the NFC device via the NFC interface 26. When collaboration information is not stored in the data storage area 32B, the control program 35 does not transmit information acquired from the NFC device to the server 80.

On the other hand, the control program 35 sets the NFC interface 26 to the reception-disabled state when determining that collaboration information is stored in the data storage area 32B. In this case, if the control program 35 has received instruction information from the server 80 that includes acquiring means information indicating the NFC interface 26, the control program 35 sets the NFC interface 26 to the reception-enabled state. Next, the control program 35 transmits information acquired from the NFC device via the NFC interface 26 to the server 80 for a collaborative operation. More specifically, the control program 35 transmits information acquired from an NFC device via the NFC interface 26 to the server 80, i.e., the return destination specified by the return URL in the instruction information, as return information for a collaborative operation.

Since the control program 35 has completed the process defined by the instruction information after transmitting the return information, the control program 35 then sets the NFC interface 26 to the reception-disabled state. The control program 35 may set the NFC interface 26 to the reception-disabled state upon acquiring information from an NFC device in conformance with the instruction information. In this case, if the control program 35 determines that collaboration information is stored in the data storage area 32B, the control program 35 does not execute the secure print function or mobile print function using the information acquired from the NFC device via the NFC interface 26.

Note that the control program 35 cannot transmit return information to the server 80 when the multifunction peripheral 10 is in the non-collaborative-operating state since the control program 35 does not receive a return URL from the server 80. Further, even if the multifunction peripheral 10 is in the collaborative-operating state, the control program 35 cannot transmit return information to the server 80 while instruction information has not been received from the server 80 since a return URL has not been saved. However, if instruction information has been received from the server 80, the control program 35 can transmit return information to the server 80 since a return URL has been saved. For convenience of description, the multifunction peripheral 10 will be said to be in a first mode when the multifunction peripheral 10 has received a return URL from the server 80 and is capable of transmitting return information to the server 80. The multifunction peripheral 10 will be said to be in a second mode when the multifunction peripheral 10 has not received a return URL from the server 80 and thus is incapable of transmitting return information to the server 80.

Operations of the Communication System

Next, operations of the communication system 100 according to the first embodiment will be described with reference to FIGS. 5 through 7(B). The process shown in FIG. 5 is performed to register the card ID of the card 70, and the user ID of the user possessing the card 70 in the service-providing apparatus 110 through an information-processing terminal 200. The process shown in FIG. 5 is executed prior to the process in FIG. 6. The process in FIG. 5 may be executed by a card issuer that issued the card 70 to the user, or may be executed by the user who acquired the card 70. The information-processing device 200 is capable of communicating with the server 80 and the service-providing apparatus 110 via the Internet, for example.

In S11 of FIG. 5, the information-processing terminal 200 accepts a user registration instruction from the card issuer. In S12 the information-processing terminal 200 transmits user information acquired from the card issuer to the service-providing apparatus 110. The service-providing apparatus 110 receives the user information from the information-processing terminal 200 in S12. Upon receiving the user information, in S13 the service-providing apparatus 110 issues a PIN assigned to the user of the card 70. Further, in S13 the service-providing apparatus 110 stores the user information received in S12 and the PIN associated with the user information in a storage (not shown) of the service-providing apparatus 110. In S14 the service-providing apparatus 110 transmits the PIN to the information-processing terminal 200.

In S14 the information-processing terminal 200 receives the PIN from the service-providing apparatus 110. In S15 the information-processing terminal 200 acquires the card ID for the card 70. In response to receiving the PIN from the service-providing apparatus 110, for example, the information-processing terminal 200 may display a message on a display prompting the user to hold the card 70 near the information-processing terminal 200 so the terminal can acquire the card ID stored on the card 70 through the wireless near field communication. In S16 the information-processing terminal 200 transmits the card ID acquired from the card 70 and the PIN received from the service-providing apparatus 110 to the server 80. Further, the information-processing terminal 200 may display the PIN received from the service-providing apparatus 110 on a display (not shown) or may transmit the PIN to the card 70 through the wireless near field communication.

In S16 the server 80 receives the card ID and the PIN from the information-processing terminal 200 through the communication interface 85. In S17 the server 80 stores the card ID and the PIN associated with the card ID received in S16 in the data storage area 92B. In S18 the server 80 transmits registration-successful information indicating that the card ID has been registered to the information-processing terminal 200 via the communication interface 85. Next, the information-processing terminal 200 receives the registration-successful information from the server 80 in S18. In response to receiving this registration-successful information, the information-processing terminal 200 displays a message on the display indicating that the card ID for the card 70 has been registered.

The card issuer transfers the card 70 registered on the service-providing apparatus 110 to the user. The card issuer may also notify the user of the card 70 of the PIN displayed on the display (not shown) of the information-processing terminal 200. The user that acquires the card 70 can then use the card 70 in the process described with reference to FIG. 6.

Figure 6:
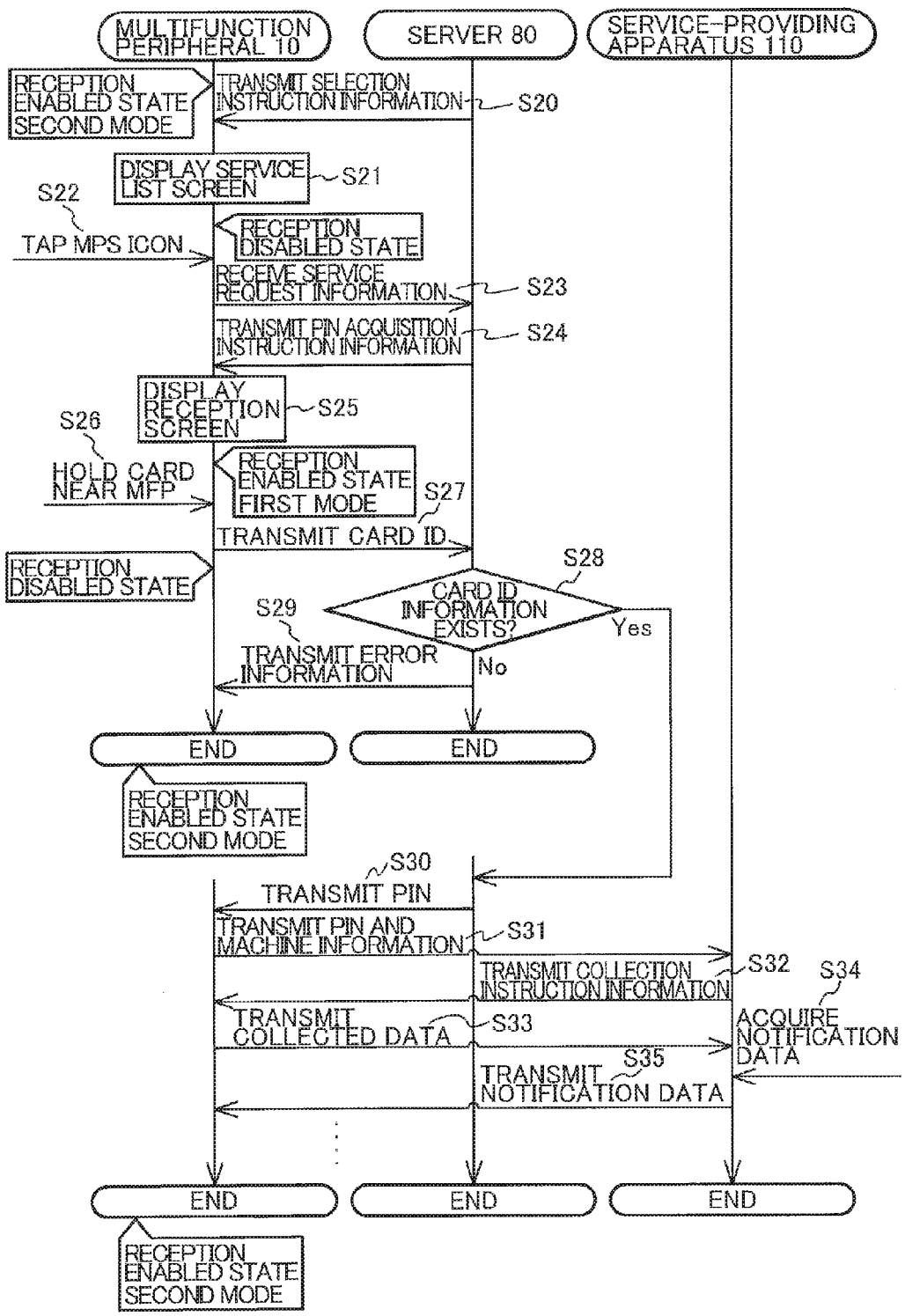
FIG. 6 is a flowchart illustrating a process for allowing the multifunction peripheral to use a service provided by a service-providing apparatus according to the first embodiment.

In the process of FIG. 6, the multifunction peripheral 10 can access services provided by the service-providing apparatus 110 using the PIN received from the server 80. Note that the control program 35 has set the NFC interface 26 to the reception-enabled state prior to executing the process shown in FIG. 6, i.e., while in the non-collaborative-operating state. Further, the multifunction peripheral 10 is in the second mode.

In S20 of FIG. 6, the control program 95 of the server 80 first transmits selection instruction information to the multifunction peripheral 10 via the communication interface 85 in response to access from the multifunction peripheral 10, for example. The selection instruction information is information for instructing the operation interface 24 to accept an operation for selecting a service provided by the service-providing apparatus 110. The selection instruction information includes an XML tag defining a service list screen, and an XML tag instructing to accept a selection operation via the operation interface 24, for example. However, the selection instruction information does not include an XML tag instructing to accept information via the NFC interface 26. Information included between the XML tags in the selection instruction information is an example of content information. The process in which the server 80 transmits selection instruction information is an example of a selection instruction transmitting process.

In S20 the control program 35 of the multifunction peripheral 10 receives the selection instruction information from the server 80 via the Wi-Fi communication interface 25. In S21 the control program 35 displays the service list screen defined in the selection instruction information received in S20 on the display 23. The control program 35 also sets the NFC interface 26 to the reception-disabled state. The process in which the multifunction peripheral 10 receives selection instruction information is an example of a selection instruction reception process.

Figure 7A:
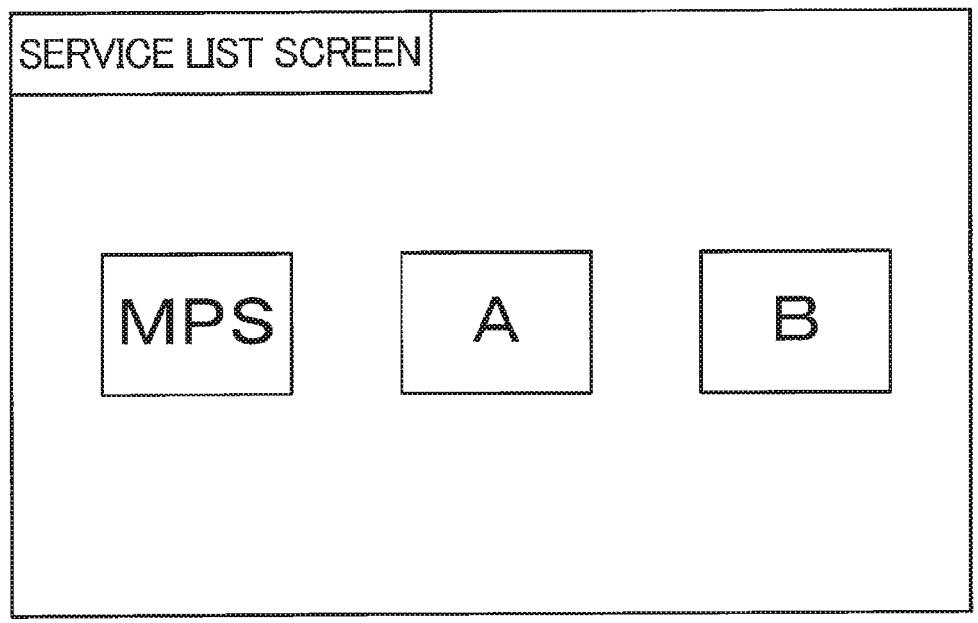
FIG. 7(A) is an explanatory diagram illustrating a service list screen displayed on a display.

FIG. 7(A) is an example of the service list screen. The service list screen includes a "MPS" icon representing a status management service, an "A" icon representing Service A, and a "B" icon representing Service B. Next, the control program 35 sets the operation interface 24 to be capable of receiving a selection operation for selecting an icon in the service list screen. The process in S21 is an example of a selection reception process for accepting an operation via the operation interface 24 that selects one of the plurality of services offered by the service-providing apparatus 110.

In S22 the control program 35 receives a selection operation via the operation interface 24 in the form of the user tapping the display 23 at a position corresponding to the "MPS" icon. After receiving the selection operation, in S23 the control program 35 transmits service request information to the server 80 via the Wi-Fi communication interface 25. The service request information is information for requesting the provision of the service selected by the selection operation. Tapping on the "MPS" icon is an example of a selection operation for selecting the status management service. The process in which the multifunction peripheral 10 transmits the service request information is an example of a service requesting process.

In S23 the control program 95 of the server 80 receives the service request information from the multifunction peripheral 10 via the communication interface 85. In response to receiving the service request information, in S24 the control program 95 transmits PIN acquisition instruction information to the multifunction peripheral 10 via the communication interface 85. The PIN acquisition instruction information is information instructing the multifunction peripheral 10 to accept a card ID from the card 70 through the wireless near field communication and to acquire a PIN via the operation interface 24. The PIN acquisition instruction information may include an XML tag defining a reception screen, an XML tag instructing the reception of a card ID via the NFC interface 26, and an XML tag instructing the acceptance of a PIN inputted via the operation interface 24. Information included between the XML tags in the PIN acquisition instruction information is an example of content information. The process in which the server 80 receives the service request information is an example of a request reception process. The process in which the server 80 transmits the PIN acquisition instruction information is an example of an acquisition instructing process.

Figure 7B:
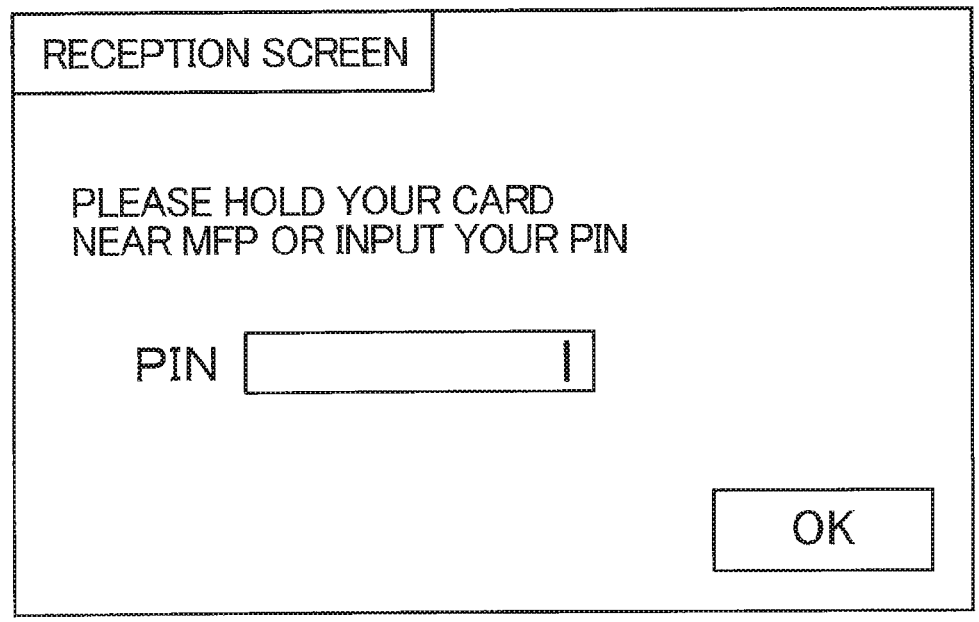
FIG. 7(B) is an explanatory diagram illustrating a reception screen displayed on the display.

In S24 the control program 35 of the multifunction peripheral 10 receives the PIN acquisition instruction information from the server 80 via the Wi-Fi communication interface 25. In S25 the control program 35 displays the reception screen defined in the PIN acquisition instruction information on the display 23. FIG. 7(B) shows an example of a reception screen prompting the user to move the card 70 near the multifunction peripheral 10. The reception screen shown in FIG. 7(B) includes the message "Please hold your card near the MFP or input your PIN," a text box next to the text "PIN" in which the user inputs a PIN via the operation interface 24, and an "OK" icon. That is, the reception screen prompts the user to move the card 70 near the multifunction peripheral 10. The process performed by the multifunction peripheral 10 to receive the PIN acquisition instruction information is an example of the acquisition instruction reception process.

In S25 the control program 35 sets the NFC interface 26 to the reception-enabled state. The control program 35 also sets the multifunction peripheral 10 to a state capable of accepting the PIN through the user's operation of the operation interface 24. The multifunction peripheral 10 is also in the first mode at this time. In other words, the control program 35 sets the NFC interface 26 to a state capable of receiving the card ID stored on the card 70 and sets the operation interface 24 to a state capable of accepting a PIN inputted by the user. The process in step S25 is an example of a status modification process.

In S26 the control program 35 receives a card ID transmitted by the card 70 via the NFC interface 26 in response to an NFC link being established between the card 70 and the NFC interface 26, i.e., in response to the card 70 being brought within a range near enough for performing NFC communications with the multifunction peripheral 10. Establishing an NFC link is an example of a connection of a wireless near field communication. The process performed by the card 70 to transmit the card ID is an example of a near-field transmission process, a direct transmission process, and a second transmission process. The process performed by the multifunction peripheral 10 to receive the card ID is an example of a direct reception process and a near-field reception process.

In S27 the control program 35 determines whether the card ID is received from the card 70. When the card ID is received, the control program 35 transmits the card ID received from the card 70 to the server 80 via the Wi-Fi communication interface 25. The control program 35 also sets the NFC interface 26 to the reception-disabled state. The process performed by the multifunction peripheral 10 to transmit the card ID is an example of an identification information transmission process. Note that the process performed in S26 when a PIN has been inputted via the operation interface 24 will be described later.

In S27 the control program 95 of the server 80 receives the card ID from the multifunction peripheral 10 via the communication interface 85. In S28 the control program 95 determines whether card ID information including a card ID that matches the received card ID (hereinafter, referred to as the relevant card ID) is stored in the data storage area 92B. The process performed by the server 80 to receive the card ID is an example of an identification information reception process. The process of step S28 is an example of a determination process.

When the control program 95 determines in S28 that the relevant card ID information is not stored in the data storage area 92B (S28: NO), in S29 the control program 95 transmits error information to the multifunction peripheral 10 via the communication interface 85. Error information is information indicating that the service cannot be provided on the basis of the card ID information. In other words, the error information indicates that reception of the service is not authorized. The process in which the server 80 transmits error information is an example of an error process. In S29 the control program 35 of the multifunction peripheral 10 receives the error information from the server 80 via the Wi-Fi communication interface 25. The control program 35 displays the content of this error information on the display 23. After the multifunction peripheral 10 subsequently shifts to the non-collaborative-operating state, the control program 35 sets the NFC interface 26 to the reception-enabled state. The multifunction peripheral 10 enters the second mode at this time.

However, when the control program 95 of the server 80 determines in S28 that the relevant card ID information is stored in the data storage area 92B (S28: YES), in S30 the control program 95 transmits the PIN stored in the data storage area 92B in association with the card ID and transmission instruction information to the multifunction peripheral 10 via the communication interface 85. The transmission instruction information includes a URL specifying the destination of the PIN, i.e., the URL of the service-providing apparatus 110 in this case, and information-specifying information that specifies the PIN. The process in which the server 80 transmits the PIN and the transmission instruction information is an example of a communication instruction process. The process in which the multifunction peripheral 10 receives the PIN is an example of an authentication information reception process.

In S30 the control program 35 of the multifunction peripheral 10 receives the PIN and the transmission instruction information from the server 80 via the Wi-Fi communication interface 25. In S31 the control program 35 transmits the PIN received from the server 80 and machine information of the multifunction peripheral 10 to the destination specified by the URL in the transmission instruction information via the Wi-Fi communication interface 25. In this case, the destination specified by the URL in the transmission instruction information is the service-providing apparatus 110. Subsequently, the multifunction peripheral 10 switches to the non-collaborative-operating state, and then the control program 35 sets the NFC interface 26 to the reception-enabled state, and the multifunction peripheral 10 enters the second mode. The process of step S31 is an example of a registration process.

In S31 the service-providing apparatus 110 receives the PIN and machine information from the multifunction peripheral 10. Next, the service-providing apparatus 110 stores the machine information and the PIN associated with the machine information in the storage (not shown) of the service-providing apparatus 110. The service-providing apparatus 110 also issues a token associated with this PIN and machine information. In S32 the service-providing apparatus 110 transmits collection instruction information to the multifunction peripheral 10. The collection instruction information includes the issued token; and information indicating the type of data to be collected, a transmission timing, and the like. The collection instruction information may specify a periodic transmission timing.

In S32 the control program 35 of the multifunction peripheral 10 receives the collection instruction information from the service-providing apparatus 110 via the Wi-Fi communication interface 25. The control program 35 stores this collection instruction information in the data storage area 32B. In S33 the control program 35 transmits the collected data and the token to the service-providing apparatus 110 via the Wi-Fi communication interface 25 at the transmission timing specified in the collection instruction information. Here, the control program 35 collects the collected data on the basis of the type of data included in the collection instruction information. Step S32 is an example of a token reception process, while step S33 is an example of a collection process.

In S33 the service-providing apparatus 110 receives the collected data from the multifunction peripheral 10. In S34 the service-providing apparatus 110 acquires notification data generated on the basis of the collected data received from the multifunction peripheral 10. In S35 the service-providing apparatus 110 transmits the notification data to the multifunction peripheral 10. Also in S35 the control program 35 receives the notification data from the service-providing apparatus 110 via the Wi-Fi communication interface 25. The control program 35 may also control the printer 11 to record an image indicated by the notification data received in S35 on recording paper and/or may display the image on the display 23. The process in steps S31-S33 is an example of a service execution process for accessing a service provided by the service-providing apparatus 110.

Further, rather than holding the card 70 near the MFP in S26, the user may instead simply input the PIN via the operation interface 24. In this case, the control program 35 receives the user operation of inputting the PIN and the user operation of tapping a position on the display 23 corresponding to the "OK" icon displayed in the reception screen via the operation interface 24. The control program 35 then executes the process from step S31 using the PIN received from the user via the operation interface 24, i.e., the PIN displayed in the text box. In other words, the process in steps S27-S30 may be omitted when the user manually inputs the PIN received from the card issuer. Accordingly, the user can receive the service provided by the service-providing apparatus 110 even when the user does not have the card 70. Alternatively, the storing unit 72 of the card 70 may store the PIN and the control program 35 may receive the PIN from the card 70 via the NFC interface 26 and execute the process from S31 using the PIN. In this case, the process in steps S27-S30 may be omitted.

Operational Advantages of the First Embodiment

In the first embodiment described above, the multifunction peripheral 10 can receive the card ID from the card 70 through NFC in order to access services provided by the service-providing apparatus 110, thereby eliminating the need for the user to perform the troublesome action of inputting the card ID. In other words, the first embodiment simplifies the user operations required to access services provided by the service-providing apparatus 110 through the multifunction peripheral 10. Further, the first embodiment can implement both functions of the multifunction peripheral 10 using information acquired from the NFC interface 26, such as the secure print function and the mobile print function, and functions implemented through collaborative operations with the server 80 in which the multifunction peripheral 10 transmits information acquired via the NFC interface 26 to the server 80.

According to the first embodiment, the user possessing a card 70 storing a card ID that has already been registered on the server 80 is allowed to access services provided by the service-providing apparatus 110. Note that the information stored on the card 70 is not limited to a card ID but may be a PIN, for example. Thus, in the process of FIG. 5, the PIN registered on the server 80 may be stored in the card 70. Hence, in S25 the control program 35 may set the NFC interface 26 to be capable of receiving at least one of a card ID and a PIN from the card 70.

Note that the first embodiment gives an example in which, through the course of the process shown in FIG. 6, both the state of the NFC interface 26 and the mode of the multifunction peripheral 10 are switched. However, the NFC interface 26 may be maintained constantly in the reception-enabled state while only the mode of the multifunction peripheral 10 is switched. For example, the multifunction peripheral 10 in the second mode may be switched to the first mode when ID acquisition instruction information is received from the server 80, and may be switched back to the second mode after transmitting a card ID to the server 80 in S25. In this case, the ID acquisition instruction information is sent from the server 80 in S24 instead of the PIN acquisition instruction information.

Further, the control program 35 may control the NFC interface 26 to operate in the P2P mode. In this case, the reception-enabled state is a state that allows both direct wireless transmission and direct wireless reception. On the other hand, the reception-disabled state is a state that allows direct wireless transmission but restricts direct wireless reception. Alternatively, the control program 35 may control the NFC interface 26 to operate in the CE mode. When operating in the CE mode, the reception-enabled state of the NFC interface 26 is the state of the NFC interface 26 when executing the listening operation, for example. Further, the reception-disabled state of the NFC interface 26 when operating in the CE mode is the state of the NFC interface 26 when the listening operation is halted, for example.

Further, while the process according to the first embodiment is implemented with the multifunction peripheral 10, the card 70, and the server 80, the portable terminal 50 may be used in place of the card 70. In this case, the method of transmitting identification information from the portable terminal 50 to the multifunction peripheral 10 is not restricted to the wireless near field communication. For example, the multifunction peripheral 10 and portable terminal 50 may exchange information (the SSID, for example) necessary for establishing a direct Wi-Fi connection through NFC, and the portable terminal 50 may subsequently use this information to establish a direct Wi-Fi connection with the multifunction peripheral 10 and to transmit identification information to the multifunction peripheral 10 using Wi-Fi Direct. In this way, NFC may be used for part of the procedure of exchanging identification information between the multifunction peripheral 10 and the portable terminal 50.

Second Embodiment

Next, referring to FIGS. 8(A)-14(B), a communication system 100 according to a second embodiment will be described, wherein like parts and components are designated with the same reference numerals to avoid duplicating description. The card 70 according to the second embodiment may be any type of card, such as a public transit smartcard or an employee ID card that is capable of transmitting a card ID stored in the storage 72 via the NFC interface 73.

The data storage area 92B in the server 80 according to the second embodiment also stores a table TB1 shown in FIG. 8(A) and a table TB2 shown in FIG. 8(B), for example. The table TB1 stores service IDs, temp IDs, and account information in association with each other. The table TB2 stores service IDs, account IDs, card IDs, account information, usernames, and machine information in association with each other. The table TB2 may also include records associated with PINs rather than card IDs. Each record included in the table TB2 is another example of the card ID information.

The service ID is an example of service identification information identifying services provided by the service-providing apparatus 110. The temp ID is unique information issued by the server 80 in association with account information. The account ID is unique information issued by the server 80 for identifying account information. The account information is an example of authentication information issued by the service-providing apparatus 110 in association with the user of the portable terminal 50. The username is the name of the user designated by the user in association with the temp ID. The PIN is designated by the user through the operation interface 24 of the multifunction peripheral 10.

The service-providing apparatus 110 according to the second embodiment provides a service for storing uploaded image data or a service for downloading image data to the multifunction peripheral 10 specifying an image to be recorded by the printer 11 on recording paper, for example. In the embodiment, the service ID of Service A will be "001", while the service ID of Service B will be "002".

Figure 9:
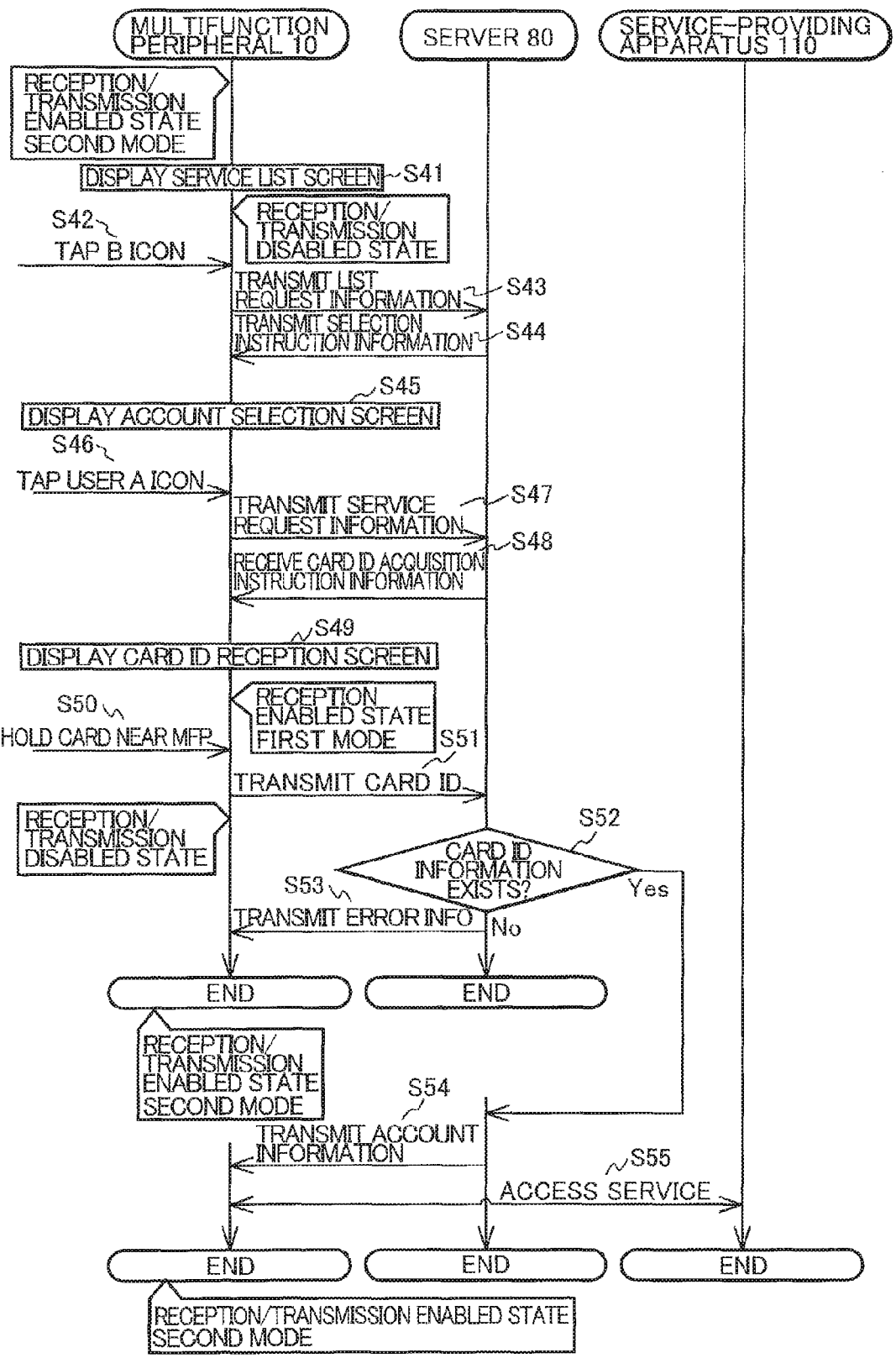
FIG. 9 is a flowchart illustrating a process for allowing the multifunction peripheral to use a service provided by a service-providing apparatus according to a second embodiment.

In the process shown in FIG. 9, the multifunction peripheral 10 receives a service provided by the service-providing apparatus 110 using account information received from the server 80. Note that the control program 35 sets the NFC interface 26 to the reception-enabled state and the transmission-enabled state prior to executing the process in FIG. 9, i.e., when the multifunction peripheral 10 is in the non-collaborative-operating state. Further, the multifunction peripheral 10 is in the second mode prior to the process of FIG. 9 being executed.

In S41 of FIG. 9, the control program 35 of the multifunction peripheral 10 displays the service list screen shown in FIG. 7(A) on the display 23. The control program 35 also sets the NFC interface 26 to the reception-disabled state and the transmission-disabled state. The step S20 described in the first embodiment may be performed for receiving the selection instruction information before performing the step S41, and thus the service list screen may be displayed on the basis of the selection instruction information. In S42 the control program 35 accepts a selection operation via the operation interface 24 in the form of a tap at the position of the "B" icon, for example. In response to receiving this selection operation, in S43 the control program 35 transmits list request information to the server 80 via the Wi-Fi communication interface 25. The list request information in this case includes machine information for the multifunction peripheral 10 and the service ID "002" for Service B. The list request information is another example of the service request information.

In S43 the control program 95 receives the list request information from the multifunction peripheral 10 via the communication interface 85. The control program 95 temporarily stores the service ID included in the list request information in the data storage area 92B. The control program 95 also identifies usernames stored in the table TB2 associated with the service ID and the machine information included in the list request information. In S44 the control program 95 transmits selection instruction information to the multifunction peripheral 10 via the communication interface 85. The process in which the server 80 transmits the selection instruction information is an example of a selection instruction process.

The selection instruction information in this case is used to prompt the user to select one of the identified usernames. For example, the selection instruction information may include an XML tag defining an account selection screen, and an XML tag instructing the operation interface 24 to accept a selection operation. However, the selection instruction information does not include an XML tag instructing the NFC interface 26 to receive information. The selection instruction information also includes account IDs and usernames stored in the data storage area 92B in association with the service ID "002" and the machine information for the multifunction peripheral 10. The XML tags included in the selection instruction information, the information provided between the XML tags, the service ID, the account IDs, and the usernames are examples of content information.

Figure 12A:
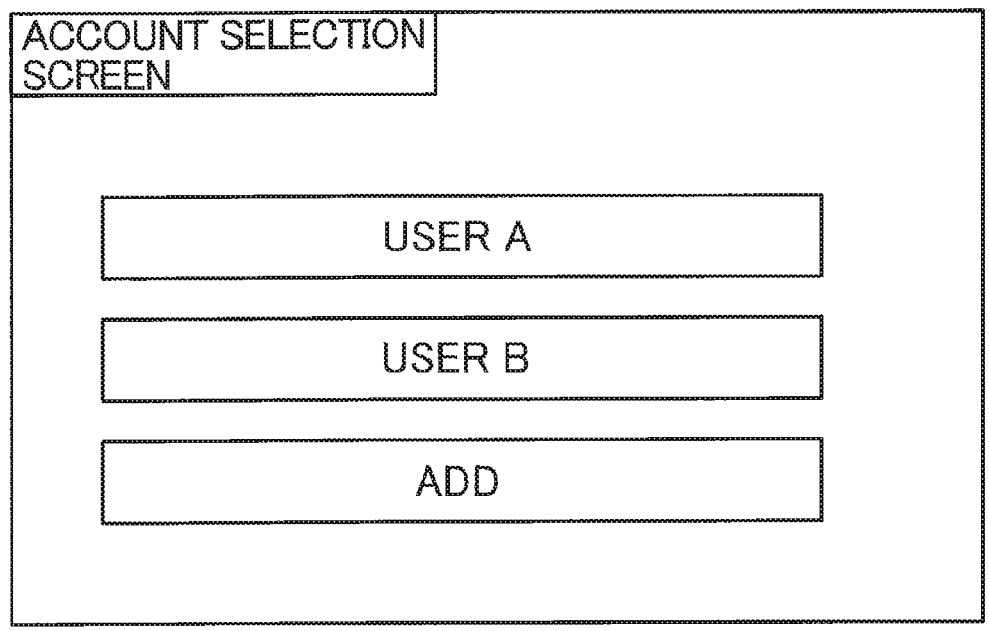
FIG. 12(A) is an explanatory diagram illustrating an account selection screen displayed on the display.

In S44 the control program 35 of the multifunction peripheral 10 receives the selection instruction information from the server 80 via the Wi-Fi communication interface 25. In S45 the control program 35 displays the account selection screen defined in the selection instruction information on the display 23. FIG. 12(A) shows an example of the account selection screen. The account selection screen shown in FIG. 12(A) includes icons displaying the usernames that are included in the selection instruction information, and an "Add" icon. The control program 35 sets the operation interface 24 to a state capable of accepting a selection operation to select one of the icons in the account selection screen. The selection operation designates an account.

In S46 the control program 35 receives a selection operation via the operation interface 24 in the form of a tap at a position of the "User A" icon, for example. In response to receiving the selection operation, in S47 the control program 35 transmits service request information to the server 80 via the Wi-Fi communication interface 25. The service request information includes an account ID associated with User A selected in the selection operation. The process in which the operation interface 24 receives a selection operation selecting an account is an example of a selection reception process.

In S47 the control program 95 of the server 80 receives the service request information from the multifunction peripheral 10 via the communication interface 85. The control program 95 references the table TB2 to determine whether the care ID or the PIN is included in the card ID information that includes an account ID matching the account ID in the service request information received in S47. If the control program 95 determines that the card ID or the PIN is included in the card ID information, in S48 the control program 95 transmits card ID acquisition instruction information to the multifunction peripheral 10 via the communication interface 85. The card ID acquisition instruction information may include an XML tag defining a card ID reception screen, and an XML tag instructing the NFC interface 26 to accept a card ID, for example. The XML tags included in the card ID acquisition instruction information and the information included between the XML tags are examples of the content information.

In S48 the control program 35 of the multifunction peripheral 10 receives the card ID acquisition instruction information from the server 80 via the Wi-Fi communication interface 25. In S49 the control program 35 displays the card ID reception screen defined in the card ID acquisition instruction information on the display 23. The card ID reception screen is displayed for prompting the user of the card 70 to hold the card 70 near the multifunction peripheral 10. For example, the card ID reception screen may be similar to the reception screen shown in FIG. 7(B), without the part related to inputting a PIN. Additionally, the control program 35 sets the NFC interface 26 to the reception-enabled state. The multifunction peripheral 10 is in the first mode at this time. Hence, the NFC interface 26 is now in a state for receiving the card ID stored on the card 70.

In S50 the control program 35 receives the card ID stored in the card 70 via the NFC interface 26 once an NFC link has been established between the card 70 and the NFC interface 26. In S51 the control program 35 transmits this card ID to the server 80 via the Wi-Fi communication interface 25. The control program 35 also sets the NFC interface 26 to the reception-disabled state. Further, the control program 35 may set the NFC interface 26 to the transmission-disabled state.

Also in S51 the control program 95 of the server 80 receives the card ID from the multifunction peripheral 10 via the communication interface 85. In S52 the control program 95 determines whether the table TB2 in the data storage area 92B stores card ID information that includes all three of a service ID matching the service ID received in S43, an account ID matching the account ID received in S47, and a card ID matching the card ID received in S51, in association with one another. That is, the control program 95 determines whether the table TB2 stores the card ID in association with the service ID and the account ID. In other words, the control program 95 determines whether the storage 92 stores the card ID in association with the account information and the account ID.

If the control program 95 determines that such card ID information is not stored in the table TB2 of the data storage area 92B (S52: NO), in S53 the control program 95 transmits error information to the multifunction peripheral 10 via the communication interface 85. Further, in S53 the control program 35 of the multifunction peripheral 10 receives the error information from the server 80 via the Wi-Fi communication interface 25. The control program 35 displays the content of this error information on the display 23. After the multifunction peripheral 10 is subsequently set to the non-collaborative-operating state, the control program 35 sets the NFC interface 26 to the reception-enabled state and the transmission-enabled state. At this time, the multifunction peripheral 10 is in the second mode.

On the other hand, if the control program 95 of the server 80 determines that such card ID information is stored in the table TB2 of the data storage area 92B (S52: YES), in S54 the control program 95 transmits the account information and transmission instruction information included in the card ID information to the multifunction peripheral 10 via the communication interface 85. The transmission instruction information includes a URL indicating the destination for transmitting the account information, i.e., the URL of the service-providing apparatus 110 in this case, and information-specifying information indicating the account information. The process in which the server 80 transmits account information is another example of the communication specifying process.

In S54 the control program 35 of the multifunction peripheral 10 receives the account information from the server 80 via the Wi-Fi communication interface 25. The control program 35 stores this account information in the data storage area 32B. In S55 the control program 35 uses the account information stored in the data storage area 32B to access services provided by the service-providing apparatus 110. The method of accessing services will be described later in a scan-and-upload process and a download-and-print process. After the multifunction peripheral 10 subsequently shifts to the non-collaborative-operating state, the control program 35 sets the NFC interface 26 to the reception-enabled state and the transmission-enabled state. At this time, the multifunction peripheral 10 is in the second mode. The process in which the multifunction peripheral 10 receives the account information is an example of the authentication information reception process. The process in S55 is an example of the service execution process. The scan-and-upload process and the download-and-print process are concrete examples of processes implemented in the service execution process and will be described later with reference to FIG. 14(A).

On the other hand, in the case where the card ID information in the table TB2 includes the PIN, when the control program 95 of the server 80 determines that the card ID information having an account ID that matches the account ID in the service request information includes a PIN, in S48 the control program 95 transmits PIN acquisition instruction information instead of the card ID acquisition instruction information to the multifunction peripheral 10 via the communication interface 85. The PIN acquisition instruction information includes an XML tag defining a PIN reception screen, and an XML tag instructing to accept input of PIN via the operation interface 24, for example. However, the PIN acquisition instruction information does not include an XML tag instructing to receive information via the NFC interface 26. The information provided between the XML tags in the PIN acquisition instruction information is an example of the content information.

In S48 the control program 35 of the multifunction peripheral 10 receives the PIN acquisition instruction information from the server 80 via the Wi-Fi communication interface 25. In S49 the control program 35 displays the PIN reception screen defined in the PIN acquisition instruction information on the display 23. The PIN reception screen is displayed to prompt the user to input a PIN via the operation interface 24. An example of the PIN reception screen is the reception screen shown in FIG. 7(B), without the part related to the card 70.

Next, the control program 35 sets the operation interface 24 to a state for accepting a user operation for inputting a PIN. However, the control program 35 does not set the NFC interface 26 to a reception-enabled state, despite receiving the PIN acquisition instruction information. In S50 the control program 35 accepts a user operation for inputting a PIN via the operation interface 24. In S51 the control program 35 transmits the PIN received via the operation interface 24 to the server 80 via the Wi-Fi communication interface 25.

Also in S51 the control program 95 of the server 80 receives the PIN from the multifunction peripheral 10 via the communication interface 85. In S52 the control program 95 determines whether the table TB2 in the data storage area 92B stores card ID information that includes all three of a service ID matching the service ID received in S43, an account ID matching the account ID received in S47, and a PIN matching the PIN received in S51, associated with one another.

If the control program 95 determines in S52 that such card ID information is not stored in the table TB2 (S52: NO), in S53 the control program 95 transmits error information to the multifunction peripheral 10 via the communication interface 85. Further, in S54 the control program 35 receives the error information from the server 80 via the Wi-Fi communication interface 25. The control program 35 displays the content of this error information on the display 23.

On the other hand, if the control program 95 determines in S52 that this card ID information is stored in the table TB2 (S52: YES), in S54 the control program 95 transmits the account information included in the card ID information to the multifunction peripheral 10 via the communication interface 85. In response to receiving the account information, the control program 35 of the multifunction peripheral 10 executes the process in S55.

New Account Registration Process

Next, the process performed when the user selects the "Add" icon in the account selection screen displayed in S45 (see FIG. 9) will be described with reference to FIG. 10. The new account registration process shown in FIG. 10 is performed to associate machine information for the multifunction peripheral 10 with account information stored in the table TB2 of the server 80.

Figure 10:
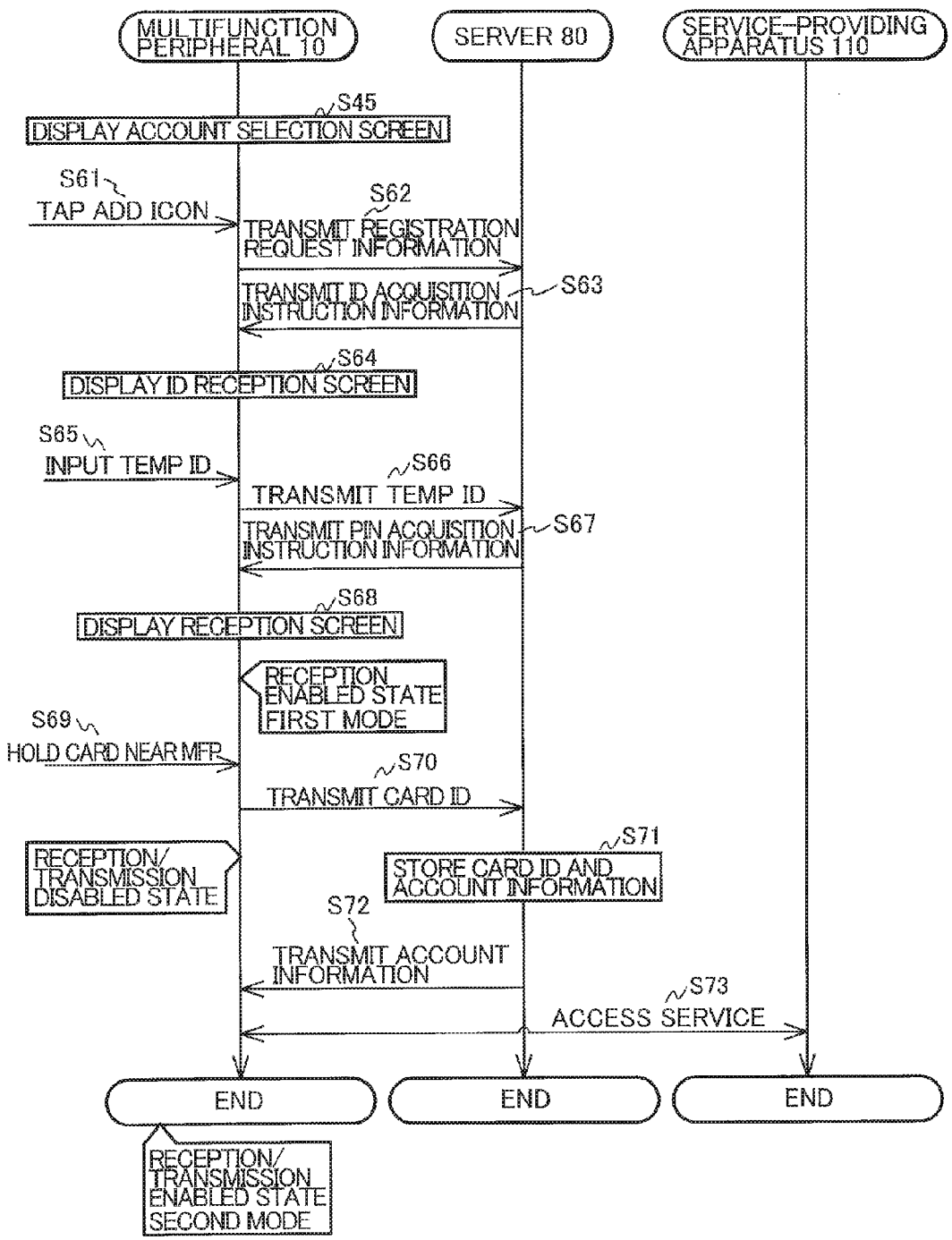
FIG. 10 is a flowchart illustrating a new account registration process according to the second embodiment.

In S61 of FIG. 10, the control program 35 of the multifunction peripheral 10 accepts a selection operation via the operation interface 24 in the form of a tap at a position corresponding to the "Add" icon. After receiving the selection operation, in S62 the control program 35 transmits registration request information to the server 80 via the Wi-Fi communication interface 25. The registration request information is another example of the service request information for requesting to register machine information and a card ID on the server 80. The process in which the multifunction peripheral 10 transmits registration request information is another example of the service requesting process.

Also in S62 the control program 95 of the server 80 receives the registration request information from the multifunction peripheral 10 via the communication interface 85. In response to receiving this registration request information, in S63 the control program 95 transmits ID acquisition instruction information to the multifunction peripheral 10 via the communication interface 85. The process in which the server 80 receives registration request information is another example of the request reception process. The process in which the server 80 transmits the ID acquisition instruction information and PIN acquisition instruction information described later is another example of the acquisition instructing process.

The ID acquisition instruction information serves to instruct to accept input of a temp ID via the operation interface 24. The ID acquisition instruction information includes an XML tag defining an ID reception screen, and an XML tag instructing the operation interface 24 to receive a temp ID, for example. However, the ID acquisition instruction information does not include an XML tag instructing to accept information via the NFC interface 26. Information included between XML tags in the ID acquisition instruction information is an example of the content information.

In S63 the control program 35 of the multifunction peripheral 10 receives the ID acquisition instruction information from the server 80 via the Wi-Fi communication interface 25. In S64 the control program 35 displays the ID reception screen defined in this ID acquisition instruction information on the display 23. The process in which the multifunction peripheral 10 receives the ID acquisition instruction information and PIN acquisition instruction information described later is an example of the acquisition instruction reception process.

Figure 12B:
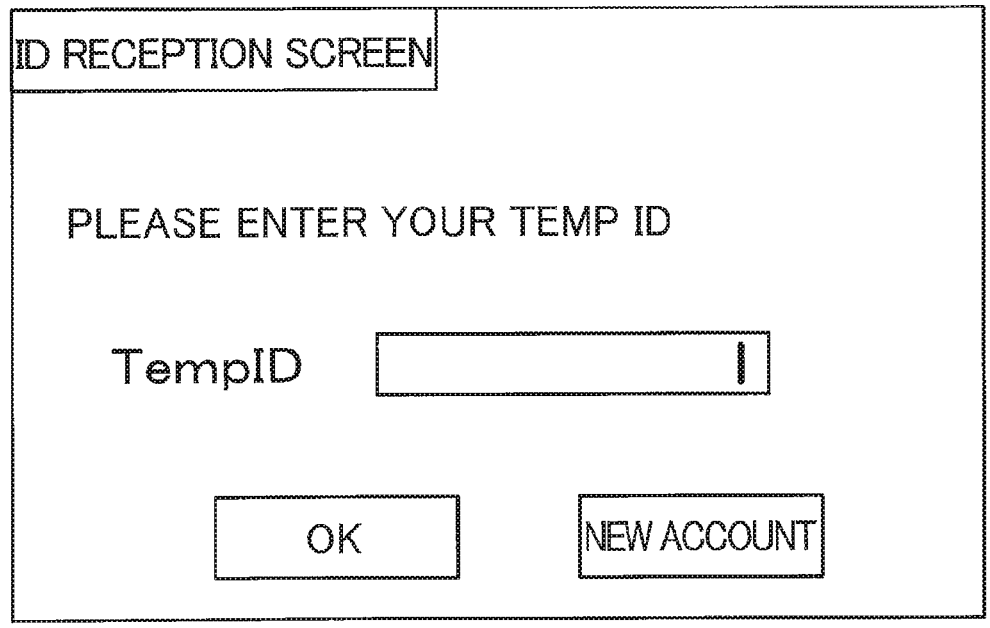
FIG. 12(B) is an explanatory diagram illustrating an ID reception screen displayed on the display.

FIG. 12(B) is an example of the ID reception screen. The ID reception screen shown in FIG. 12(B) includes the message "Please enter your Temp ID," a text box displayed next to the text "Temp ID" for inputting the temp ID via the operation interface 24, an "OK" icon, and a "New Account" icon. Next, the control program 35 sets the operation interface 24 to a state capable of accepting user operations for inputting a temp ID. In other words, in S64 the control program 35 sets the multifunction peripheral 10 to a state to receive the user's input of the Temp ID via the operation interface 24. The processes in S64 and S68 described later are other examples of the status modification process.

In S65 the control program 35 receives via the operation interface 24 a user operation to input a temp ID, and a user operation of tapping a position corresponding to the "OK" icon. In S66 the control program 35 transmits the temp ID received from the user via the operation interface 24, i.e., the temp ID displayed in the text box, and machine information of the multifunction peripheral 10 to the server 80 via the Wi-Fi communication interface 25. The process in which the multifunction peripheral 10 transmits the temp ID, the machine information, and a card ID described later is an example of the identification information transmitting process and the third transmitting process.

Note that in step S65 the control program 35 may accept input of the username associated with the temp ID via the operation interface 24. Then in S66 the control program 35 may transmit the inputted username to the server 80 via the Wi-Fi communication interface 25. Similarly, the control program 35 may accept input of a username in step S69 described later.

Also in S66 the control program 95 of the server 80 receives the temp ID and the machine information from the multifunction peripheral 10 via the communication interface 85. The control program 95 temporarily stores the temp ID and the machine information in the data storage area 92B. In S67 the control program 95 transmits PIN acquisition instruction information to the multifunction peripheral 10 via the communication interface 85. The PIN acquisition instruction information may be similar to that in step S24 described in FIG. 6, for example. The process in which the server 80 receives the temp ID, the machine information, and the card ID described later is another example of the identification information reception process.

Also in S67 the control program 35 of the multifunction peripheral 10 receives the PIN acquisition instruction information from the server 80 via the Wi-Fi communication interface 25. In S68 the control program 35 displays the reception screen shown in FIG. 7(B) on the display 23 in accordance with the PIN acquisition instruction information for prompting the user to move the card 70 near the multifunction peripheral 10 and the user to input the PIN. The control program 35 also sets the NFC interface 26 to the reception-enabled state. At this time, the multifunction peripheral 10 is set to the first mode. In other words, the control program 35 sets the NFC interface 26 to a state capable of receiving the card ID stored on the card 70.

In S69 the control program 35 receives the card ID from the card 70 via the NFC interface 26 as a result of an NFC link being established between the card 70 and the NFC interface 26. In S70 the control program 35 transmits this card ID to the server 80 via the Wi-Fi communication interface 25. In S69 the control program 35 can accept a user operation to input a PIN via the operation interface 24. In this case, in S70 the control program 35 transmits the PIN received via the operation interface 24 to the server 80 via the Wi-Fi communication interface 25. Further, the control program 35 sets the NFC interface 26 to the reception-disabled state and the transmission-disabled state after transmitting the card ID or PIN to the server 80.

Also in S70 the control program 95 of the server 80 receives the card ID from the multifunction peripheral 10 via the communication interface 85. In S71 the control program 95 identifies the account information associated with the service ID and the temp ID received in S43 and S66 from the table TB1 in the data storage area 92B. In other words, the control program 95 determines whether the table TB1 stores the received card ID in association with the temp ID and the account information and identifies the account information associated with the received card ID. The control program 95 also issues an account ID in association with the identified account information. The account ID is an ID that uniquely identifies the account information. For example, the account ID may be a sequential number. The control program 95 correlates the identified account information, the issued account ID, the machine information received in S65, and the card ID received in S70 and stores this correlated information in the table TB2 in the data storage area 92B. The control program 95 may store the username in association with this correlated information in the table TB2 if the username is received in S66 or S70.

However, the control program 95 of the server 80 can receive a PIN from the multifunction peripheral 10 via the communication interface 85 in S70 instead of the card ID. In this case, the control program 95 correlates the identified account information, the issued account ID, the machine information received in S65, the PIN received in S70, and the service ID received in S43 and stores this correlated information in the table TB2 of the data storage area 92B. Further, in S72 the control program 95 transmits the account information correlated with the card ID or the PIN in S71 to the multifunction peripheral 10 via the communication interface 85. The process in step S71 is an example of a storage control process. The process in which the server 80 transmits account information is an example of an authentication information transmission process.

Also in S72 the control program 35 of the multifunction peripheral 10 receives the account information from the server 80 via the Wi-Fi communication interface 25. The process in which the multifunction peripheral 10 receives the account information is another example of an authentication information reception process. The control program 35 stores this account information in the data storage area 32B. In S73 the control program 35 uses the account information stored in the data storage area 32B to access and receive services provided by the service-providing apparatus 110. After the multifunction peripheral 10 subsequently shifts to the non-collaborative-operating state, the control program 35 sets the NFC interface 26 to the reception-enabled state and the transmission-enabled state. At this time, the multifunction peripheral 10 is in the second mode.

Process for Issuing a New Account

Next, a process performed when the "New Account" icon is selected from the ID reception screen (FIG. 12(B)) displayed in S64 (see FIG. 10) will be described with reference to FIG. 11. The process for issuing a new account is performed to store account information issued by the service-providing apparatus 110 and a temp ID issued by the server 80 in correlation with this account information on the server 80.

Figure 11:
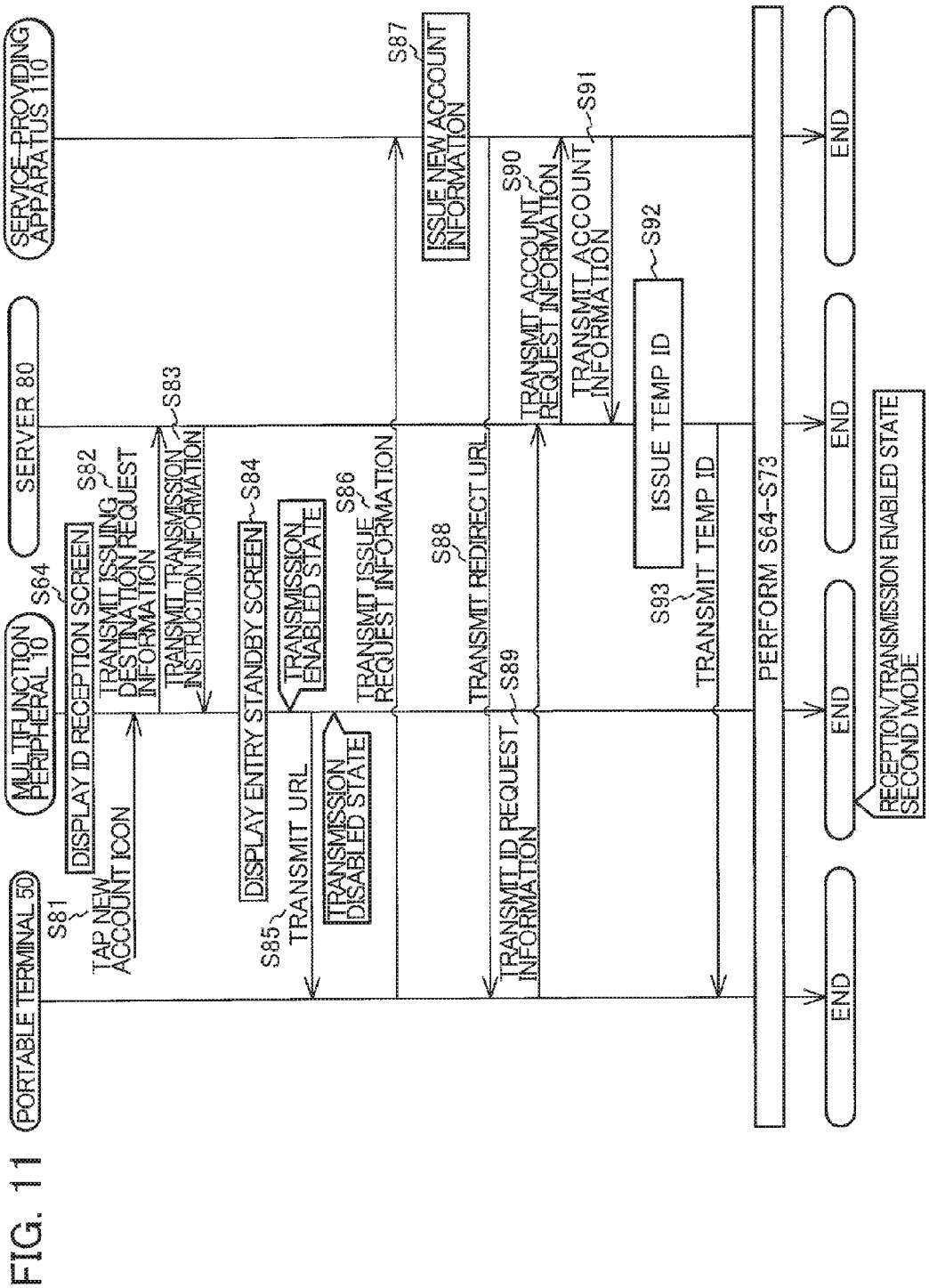
FIG. 11 is a flowchart illustrating a process for issuing a new account according to the second embodiment.

In S81 of FIG. 11, the control program 35 of the multifunction peripheral 10 accepts a selection operation via the operation interface 24 in the form of a tap at a position corresponding to the "New Account" icon in the ID reception screen. In response to receiving the selection operation, in S82 the control program 35 transmits issuing destination request information to the server 80 via the Wi-Fi communication interface 25. The issuing destination request information requests the transmission of a URL indicating the destination for issuing new account information. The process in which the multifunction peripheral 10 transmits this issuing destination request information is another example of the service requesting process.

Also in S82 the control program 95 of the server 80 receives the issuing destination request information from the multifunction peripheral 10 via the communication interface 85. After receiving the issuing destination request information, in S83 the control program 95 transmits transmission instruction information to the multifunction peripheral 10 via the communication interface 85. The process in which the server 80 transmits transmission instruction information is an example of a transmission instructing process.

The transmission instruction information instructs the multifunction peripheral 10 to transmit the URL of the issuing destination to the portable terminal 50 via the NFC interface 26. For example, the transmission instruction information includes the URL of the issuing destination, an XML tag defining an entry standby screen, and an XML tag instructing that the URL for the issuing destination be transmitted via the NFC interface 26. The URL for the issuing destination is an example of connection destination information specifying a connection destination with which the portable terminal 50 is to connect in order to receive the provision of services from the service-providing apparatus 110. The information included between XML tags in the transmission instruction information is an example of the content information.

Figure 13A:
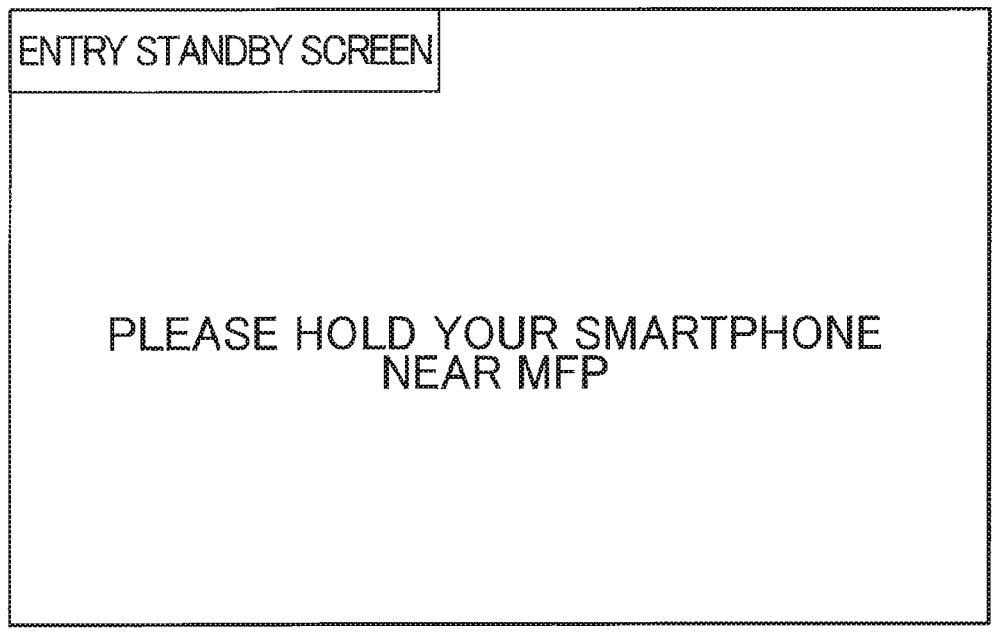
FIG. 13(A) is an explanatory diagram illustrating an entry standby screen displayed on the display.

In S83 the control program 35 of the multifunction peripheral 10 receives the transmission instruction information from the server 80 via the Wi-Fi communication interface 25. In S84 the control program 35 displays the entry standby screen defined in the transmission instruction information on the display 23. FIG. 13(A) shows an example of the entry standby screen. The entry standby screen in FIG. 13(A) includes the message "Please hold your smartphone near the MFP." The process in which the multifunction peripheral 10 receives the transmission instruction information is an example of a transmission instruction reception process.

The control program 35 also sets the NFC interface 26 to the transmission-enabled state. Further, the control program 35 stores the URL for the issuing destination included in the transmission instruction information in an area of the data storage area 62B that the NFC interface 26 can reference. Being set in the transmission-enabled state, the NFC interface 26 transmits information acquired by referencing the data storage area 62B through an NFC link once the NFC link is established between the portable terminal 50 and the NFC interface 26. In other words, the control program 35 sets the NFC interface 26 to a state in which the NFC interface 26 can transmit the URL of the issuing destination extracted from the transmission instruction information to the portable terminal 50.

When the NFC link is established between the portable terminal 50 and the NFC interface 26, in S85 the control program 35 transmits the URL of the issuing destination to the portable terminal 50 via the NFC interface 26. The control program 35 also sets the NFC interface 26 to the transmission-disabled state. The process of step S84 is an example of the transmission standby process. The process in which the multifunction peripheral 10 transmits the URL of the issuing destination is an example of a first transmission process. The URL of the issuing destination specifies the service-providing apparatus 110 in the embodiment. When the multifunction peripheral 10 subsequently shifts to the non-collaborative-operating state, the control program 35 sets the NFC interface 26 to the reception-enabled state and the transmission-enabled state. At this time, the multifunction peripheral 10 is in the second mode.

In S85 the control program 65 of the portable terminal 50 receives the URL of the issuing destination from the multifunction peripheral 10 via the NFC interface 56. In S86 the control program 65 transmits issue request information to the issuing destination indicated by the URL via the mobile communication interface 55. This access of the portable terminal 50 to the URL designated by the issuing destination request information is a trigger of issuance of the account information by the service-providing apparatus 110. The issue request information is information for requesting the issuance of new account information. The process in which the portable terminal 50 receives the URL of the issuing destination is an example of the near-field reception process.

Also in S86 the service-providing apparatus 110 receives the issue request information from the portable terminal 50. In response to receiving this issue request information, in S87 the service-providing apparatus 110 issues new account information. The account information issued by the service-providing apparatus 110 in S87 uniquely identifies the user of the service-providing apparatus 110. In S88 the service-providing apparatus 110 transmits a redirect URL to the portable terminal 50. The redirect URL is information specifying the location of the server 80, which will issue the temp ID in association with the account information.

Also in S88 the control program 65 of the portable terminal 50 receives the redirect URL from the service-providing apparatus 110 via the mobile communication interface 55. In S89 the control program 65 transmits ID request information to the issuing source indicated in the redirect URL via the mobile communication interface 55. The ID request information is information for requesting the issuing source, i.e., the server 80, to issue a new temp ID.

In S89 the control program 95 of the server 80 receives the ID request information from the portable terminal 50 via the communication interface 85. In response to receiving the ID request information, in S90 the control program 95 transmits account request information to the service-providing apparatus 110 via the communication interface 85. The account request information is information requesting the service-providing apparatus 110 to transmit the account information issued in S87. Next, in S90 the service-providing apparatus 110 receives the account request information from the server 80. In response to receiving the account request information, in S91 the service-providing apparatus 110 transmits the account information issued in S87 to the server 80.

In S91 the control program 95 of the server 80 receives the account information from the service-providing apparatus 110 via the communication interface 85. In response to receiving this account information, in S92 the control program 95 issues a temp ID. The temp ID is information that the server 80 issues in order to associate account information with the multifunction peripheral 10. The temp ID is an example of account identification information. The temp ID has a valid period of one day, for example. The temp ID issued by the server 80 at this time differs from any other temp ID in valid period. Also in S92 the control program 95 associates the newly issued temp ID with the service ID received from the multifunction peripheral 10 in S43, and the account information received from the service-providing apparatus 110 in S91, and stores the service ID, the account information, and the temp ID associated with one another in the table TB1 of the data storage area 92B. In S93 the control program 95 transmits the temp ID associated with the account information to the portable terminal 50 via the communication interface 85.

In S93 the control program 95 of the portable terminal 50 receives the temp ID from the server 80 via the mobile communication interface 55. The control program 95 displays this temp ID on the display 53. The process in steps S86-S93 is an example of the data reception process in which a temp ID is received from the server 80 by accessing the request destination specified by the connection destination information. Upon viewing the temp ID on the display 53, the user can use this temp ID in the process of steps S64-S73. Similarly to the process shown in FIG. 10, after the multifunction peripheral 10 subsequently shifts to the non-collaborative-operating state, the control program 35 sets the NFC interface 26 to the reception-enabled state and the transmission-enabled state. At this time, the multifunction peripheral 10 is in the second mode.

Scan-and-Upload Process

Next, the scan-and-upload process will be described as an example of the service execution process. The scan-and-upload process may be executed in S55 shown in FIG. 9, for example. In S101 of FIG. 14(A), the control program 35 of the multifunction peripheral 10 transmits address request information and account information to the server 80 via the Wi-Fi communication interface 25. The address request information is information requesting address information specifying the upload destination for image data. The address information may be in the format of a URL, for example.

Next, in S101 the control program 95 of the server 80 receives the address request information and the account information from the multifunction peripheral 10 via the communication interface 85. In S102 the control program 95 of the server 80 transmits the address request information and the account information received in S101 to the service-providing apparatus 110 via the communication interface 85. In the embodiment, the service-providing apparatus 110 is the upload destination.

In S102 the service-providing apparatus 110 receives the address request information and the account information and authenticates the account information. If authentication is successful, in S103 the service-providing apparatus 110 transmits address information to the server 80. The address information includes a URL specifying the location of the service-providing apparatus 110 itself. Note that the service-providing apparatus 110 may determine that the account information is authenticated successfully when account information matching the received account information is stored in the storage of the service-providing apparatus 110, and may determine that authentication failed when account information matching the received account information is not stored in the storage, for example. The same method of authentication may be used in other situations.

In S103 the control program 95 receives the address information from the service-providing apparatus 110 via the communication interface 85. In S104 the control program 95 transmits this address information to the multifunction peripheral 10 via the communication interface 85. The process in which the service-providing apparatus 110 transmits address information is an example of an address specification process. Note that the address request information received by the server 80 and the address request information transmitted by the server 80 may be in the same format or different formats. The same holds true for the address information.

In S104 the control program 35 receives the address information from the server 80 via the Wi-Fi communication interface 25. The control program 35 temporarily stores this address information in the data storage area 32B. In S105 the control program 35 controls the scanner 12 to execute a scanning process for generating image data by reading an image recorded on an original. The process in S104 is an example of an address information reception process, while the process in S105 is an example of a generation process.

In S106 the control program 35 transmits the image data generated by the scanner 12 and the account information that is received in S54, for example to the service-providing apparatus 110 specified by the address information via the Wi-Fi communication interface 25. The process in step S106 is an example of an uploading process. In S106 the service-providing apparatus 110 receives the image data and the account information from the multifunction peripheral 10. The service-providing apparatus 110 stores the received image data in the storage after successfully authenticating the account information. In S107 the service-providing apparatus 110 transmits completion information to the multifunction peripheral 10.

In S107 the control program 35 receives the completion information from the service-providing apparatus 110 via the Wi-Fi communication interface 25 indicating that the image data was stored on the service-providing apparatus 110. In S108 the control program 35 transmits this completion information to the server 80 via the Wi-Fi communication interface 25.

In S108 the control program 95 of the server 80 receives the completion information from the multifunction peripheral 10 via the communication interface 85. In S109 the control program 95 transmits completion confirmation information including the results of interpreting this completion information to the multifunction peripheral 10 via the communication interface 85. In S109 the control program 35 of the multifunction peripheral 10 receives the completion confirmation information from the server 80 via the Wi-Fi communication interface 25. At this time, the control program 35 recognizes that the scan-and-upload process was completed normally on the basis of the completion confirmation information, and subsequently ends the scan-and-upload process.

Download-and-Print Process

Next, the download-and-print process will be described as another example of the service execution process. The download-and-print process may be executed in S55 shown in FIG. 9, for example. In S111 of FIG. 14(B), the control program 35 of the multifunction peripheral 10 transmits location request information and account information to the server 80 via the Wi-Fi communication interface 25. The location request information is information requesting the transfer of location information indicating the downloading source for desired image data. The location information may be in the format of a URL that includes data identification information for identifying the image data, for example.

In S111 the control program 95 of the server 80 receives the location request information and the account information from the multifunction peripheral 10 via the communication interface 85. In S112 the control program 95 transmits the location request information and the account information received in S111 to the service-providing apparatus 110 via the communication interface 85. In the embodiment, the service-providing apparatus 110 is the download source.

In S112 the service-providing apparatus 110 receives the location request information and the account information from the server 80 and authenticates the account information. Upon successful authentication of the account information, in S113 the service-providing apparatus 110 transmits location information to the server 80. The location information includes a URL specifying the location of the service-providing apparatus 110 itself. Next, in S113 the control program 95 of the server 80 receives the location information from the service-providing apparatus 110 via the communication interface 85. In S114 the control program 95 transmits the location information to the multifunction peripheral 10 via the communication interface 85.

In S114 the control program 35 of the multifunction peripheral 10 receives the location information from the server 80 via the Wi-Fi communication interface 25. Next, in S114A the control program 35 transmits request information requesting the transmission of image data at the location specified in the location information received in S114 together with the account information received in S54 to the service-providing apparatus 110 specified in the location information. In S114A, the service-providing apparatus 110 receives the request information and the account information. The service-providing apparatus 110 then authenticates the account information and, in response to successful authentication, in S115 transmits the requested image data to the multifunction peripheral 10.

In S115 the control program 35 of the multifunction peripheral 10 receives the image data from the service-providing apparatus 110 via the Wi-Fi communication interface 25. In S116 the control program 35 controls the printer 11 to record an image specified by the image data on recording paper. The process in S115 is an example of a data reception process, while the process in S116 is an example of a recording process.

Operational Advantages of the Second Embodiment

In the second embodiment described above, the multifunction peripheral 10 can receive the card ID from the card 70 through NFC in order to access services provided by the service-providing apparatus 110, thereby eliminating the need for the user to perform the troublesome action of inputting the card ID, similarly to the first embodiment. In other words, the second embodiment simplifies the user operations required to access services provided by the service-providing apparatus 110 through the multifunction peripheral 10. Further, in S85 the portable terminal 50 receives the URL of the issuing destination from the multifunction peripheral 10 via the NFC interface 56. The portable terminal 50 can access the service-providing apparatus 110 on the basis of the received URL. That is, the portable terminal 50 can receive information that the service-providing apparatus 110 transmits.

Note that in the second embodiment it is not necessary for card IDs recorded on the server 80 to be unique, provided that the combinations of account IDs and card IDs registered in the server 80 are unique. As an alternative, it is possible to provide unique combinations of service IDs and card IDs recorded in the server 80 or unique combinations of service IDs, account IDs, and card IDs recorded in the server 80.

In other words, the card in the second embodiment need not be the card 70 issued by a card issuer as in the first embodiment, but may be any smartcard, such as a public transit smartcard or an employee ID card. Further, the multifunction peripheral 10 according to the second embodiment may receive identification information from the portable terminal 50 rather than the card 70. In this case, the identification information may be a MAC (Media Access Control) address set on the mobile communication interface 55 of the portable terminal 50 or a telephone number set in the portable terminal 50, for example.

While the second embodiment gives a description of the multifunction peripheral 10 acquiring a temp ID in step S65 and acquiring a card ID or a PIN in step S69, the present disclosure is not limited to the order in which the information is acquired. For example, in step S69 the multifunction peripheral 10 may accept an operation to input a temp ID via the operation interface 24 and may receive a card ID via the NFC interface 26.

Further, the multifunction peripheral 10 according to the second embodiment can transmit the URL of the issuing destination to the portable terminal 50 via the NFC interface 26. In this way, the multifunction peripheral 10 can easily register in the server 80 the temp ID and the account information of a user attempting to access services provided by the service-providing apparatus 110 for the first time. In other words, services provided by the service-providing apparatus 110 can be accessed through the multifunction peripheral 10 and some of these services are easily accessed on the portable terminal 50.

Note that the control program 35 may operate the NFC interface 26 in the P2P mode in the process shown in FIG. 10. In this case, the transmission-enabled state is a state that allows both direct wireless transmission and direct wireless reception. The transmission-disabled state, on the other hand, allows direct wireless reception but restricts direct wireless transmission. Further, the control program 35 may operate the NFC interface 26 in the CE mode. When operating in the CE mode, the transmission-enabled state of the NFC interface 26 is a state in which the NFC interface 26 can execute a listening operation, while the transmission-disabled state is a state in which the listening operation is halted in the NFC interface 26.

Third Embodiment

Next, referring to FIG. 15, a communication system 100 according to a third embodiment will be described, wherein like parts and components are designated with the same reference numerals to avoid duplicating description. The service-providing apparatus 110 according to the third embodiment provides a conversion service for converting the format of uploaded image data. The communication system 100 according to the third embodiment executes a process for allowing the portable terminal 50 to receive data whose format has been converted by the service-providing apparatus 110 (hereinafter called "converted data"). Note that the control program 35 sets the NFC interface 26 to its transmission-enabled state prior to executing the process shown in FIG. 15, i.e., while the multifunction peripheral 10 is in the non-collaborative-operating state.

Figure 13B:
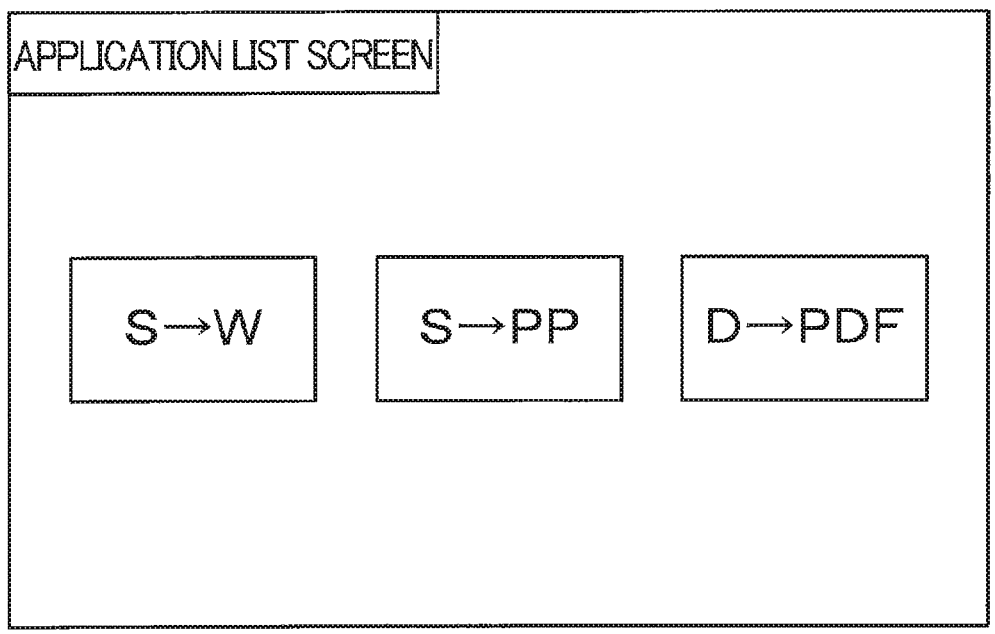
FIG. 13(B) is an explanatory diagram illustrating an application list screen displayed on the displaying unit.
Figure 15:
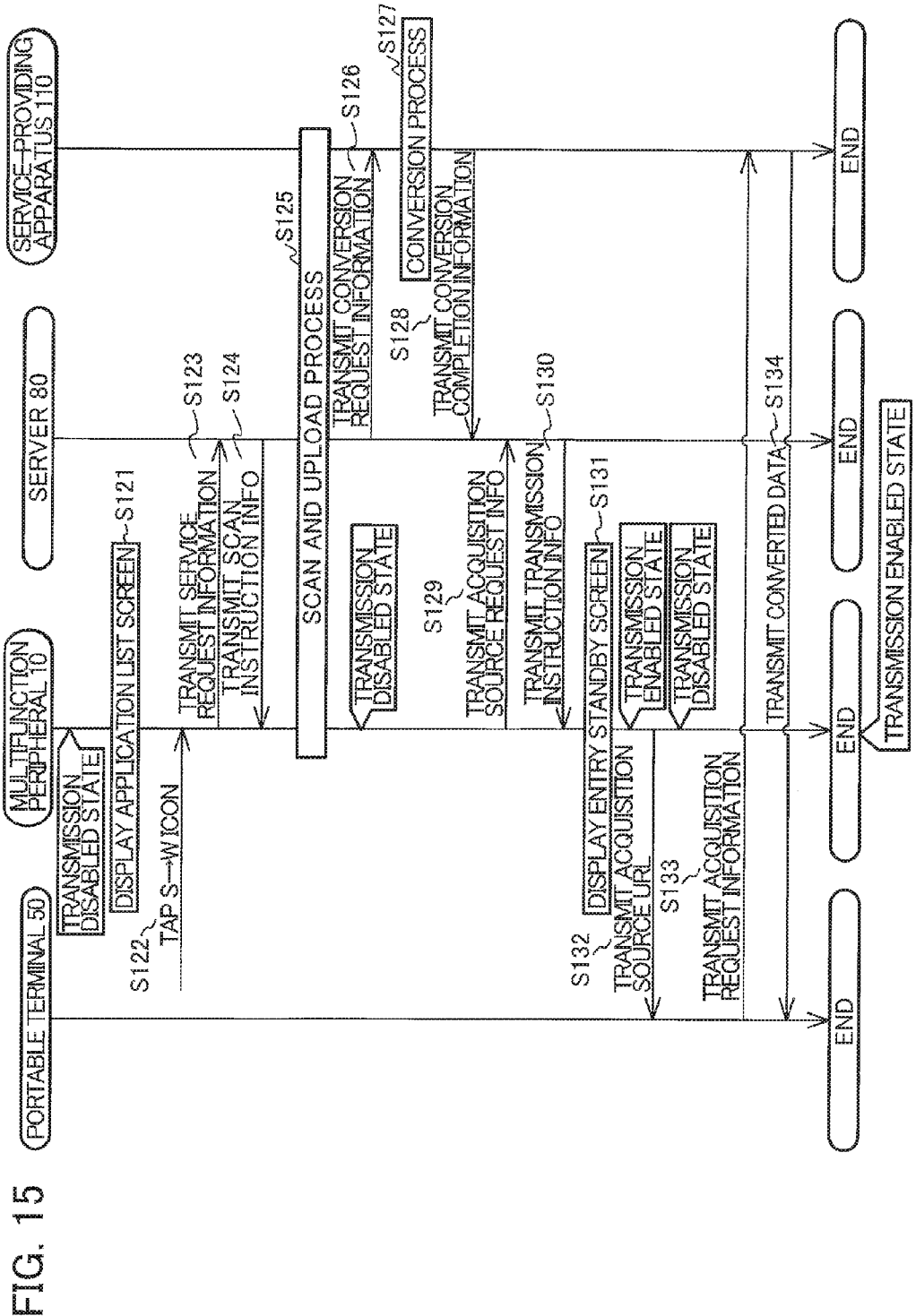
FIG. 15 is a flowchart illustrating a process for allowing the multifunction peripheral and the mobile terminal to use a service provided in the service according to the third embodiment.

In S121 in FIG. 15, the control program 35 of the multifunction peripheral 10 displays an application list screen on the display 23. FIG. 13(B) shows an example of the application list screen. The application list screen in FIG. 13(B) includes a "S→W" icon indicating a service for converting the data format from an image format to a document format, a "S→PP" icon indicating a service for converting the data format from an image format to a presentation format, and a "S→PDF" icon indicating a service for converting the data format from an image format to a PDF format.

In S122 the control program 35 receives a user operation via the operation interface 24 in the form of a tap at a position corresponding to the "S→W" icon. Upon receiving the selection of the "S→W" icon, in S123 the control program 35 transmits service request information to the server 80 via the Wi-Fi communication interface 25 requesting the provision of the conversion service. In this example, the requested conversion service is a service for converting the data format from an image format to a document format. Also in S123 the control program 95 of the server 80 receives the service request information from the multifunction peripheral 10 via the communication interface 85. Upon receiving the service request information, in S124 the control program 95 transmits scan instruction information to the multifunction peripheral 10 via the communication interface 85.

In S124 the control program 35 of the multifunction peripheral 10 receives the scan instruction information from the server 80 via the Wi-Fi communication interface 25. In S125 the control program 35 executes the scan-and-upload process according to the scan instruction information received in S124. The control program 35 also sets the NFC interface 26 to the transmission-disabled state. Since the scan-and-upload process has already been described with reference to FIG. 14(A), a description of this process will not be repeated here. The account information used in the scan-and-upload process may be obtained similarly to the process shown in FIG. 9. For example, the account information is obtained by executing the processes S50-S54 shown in FIG. 9. The process of step S125 in which the multifunction peripheral 10 transmits image data is an example of a conversion request process.

However, the completion confirmation information (see S109 in FIG. 14(A)) in the scan-and-upload process according to the third embodiment includes an instruction to transmit acquisition request information described later to the multifunction peripheral 10. Hence, after the control program 35 receives the completion confirmation information from the server 80 via the Wi-Fi communication interface 25, in S129 the control program 35 transmits acquisition source request information to the server 80 via the Wi-Fi communication interface 25. The acquisition source request information is information requesting the server 80 to transmit transmission instruction information described later. The control program 35 repeatedly transmits the acquisition source request information until transmission instruction information is received from the server 80.

As described above, the control program 95 of the server 80 transmits completion confirmation information to the multifunction peripheral 10 via the communication interface 85. In S126 the control program 95 transmits conversion request information to the service-providing apparatus 110 via the communication interface 85. The conversion request information is information for requesting the service-providing apparatus 110 to convert the format of the image data uploaded to the service-providing apparatus 110 in the scan-and-upload process to a document format specified by the multifunction peripheral 10 in S123.

In S126 the service-providing apparatus 110 receives the conversion request information from the server 80. In S127 the service-providing apparatus 110 converts the image data received from the multifunction peripheral 10 to document data. The conversion process in step S127 is essentially a process of converting the data format to a document format and does not convert the content of the image specified in the image data. As an example, the data format of the pre-converted data may be the JPEG (Joint Photographic Experts Group) format, PNG (Portable Network Graphics) format, or bitmap format, while the format of the converted data may be a document format such as the Microsoft Word (a registered trademark of the Microsoft Corporation) format or the PDF (Portable Document Format) format.

In response to completing the conversion process, in S128 the service-providing apparatus 110 transmits conversion completion information to the server 80. The conversion completion information includes information indicating that the conversion process was completed and the acquisition source URL indicating the acquisition source for the converted data. The acquisition source URL specifies the service-providing apparatus 110 in this embodiment. The acquisition source URL is an example of a connection destination information specifying the location of the converted data and is an example of a download information needed for downloading the converted data.

Next, the control program 95 of the server 80 receives the conversion completion information from the service-providing apparatus 110. Once the control program 95 receives the acquisition source request information from the multifunction peripheral 10 after receiving the conversion completion information (S129), in S130 the control program 95 transmits the transmission instruction information to the multifunction peripheral 10 via the communication interface 85. The transmission instruction information is information for instructing the multifunction peripheral 10 to transmit the acquisition source URL extracted from the conversion completion information to the portable terminal 50 via the NFC interface 26. The transmission instruction information includes an XML tag defining the entry standby screen, and an XML tag instructing the transmission of the acquisition source URL via the NFC interface 26. Information included between XML tags in the transmission instruction information is an example of the content information.

In S130 the control program 35 of the multifunction peripheral 10 receives the transmission instruction information from the server 80 via the Wi-Fi communication interface 25. The control program 35 extracts the acquisition source URL from the transmission instruction information. In S131 the control program 35 displays the entry standby screen shown in FIG. 13(A) on the display 23 based on the transmission instruction information. The control program 35 also sets the NFC interface 26 to the transmission-enabled state. In other words, the control program 35 sets the NFC interface 26 to a state capable of transmitting to the portable terminal 50 the acquisition source URL extracted from the transmission instruction information.

In S132 the control program 35 transmits the acquisition source URL to the portable terminal 50 via the NFC interface 26 once an NFC link has been established between the portable terminal 50 and the NFC interface 26. The control program 35 also sets the NFC interface 26 to the transmission-disabled state. The process in which the multifunction peripheral 10 transmits the acquisition source URL is an example of a first transmission process and a download information transmission process. The process performed by the multifunction peripheral 10 in steps S125-S132 is another example of the service execution process. After the multifunction peripheral 10 subsequently shifts to the non-collaborative-operating state, the control program 35 sets the NFC interface 26 to the transmission-enabled state.

Next, in S132 the control program 65 of the portable terminal 50 receives the acquisition source URL from the multifunction peripheral 10 via the NFC interface 56 once an NFC link has been established between the multifunction peripheral 10 and the NFC interface 56. In S133 the control program 65 transmits acquisition request information via the mobile communication interface 55 to the acquisition source specified by the acquisition source URL received in S132. The acquisition request information is information requesting transmission of the converted data converted by the service-providing apparatus 110. In S134 the control program 65 receives the converted data from the multifunction peripheral 10 via the mobile communication interface 55. The process performed by the portable terminal 50 to receive the acquisition source URL is another example of the near-field reception process. The process in which the portable terminal 50 receives the converted data is an example of the data reception process. After the multifunction peripheral 10 subsequently shifts to the non-collaborative-operating state, the control program 35 sets the NFC interface 26 to the transmission-enabled state.

Operational Advantages of the Third Embodiment

The multifunction peripheral 10 according to the third embodiment can transmit an acquisition source URL to the portable terminal 50 via the NFC interface 26. In this way, the multifunction peripheral 10 easily enables the portable terminal 50 to receive converted data that has been converted by the service-providing apparatus 110. In other words, the third embodiment, as with the second embodiment described above, enables services provided by the service-providing apparatus 110 to be accessed through the multifunction peripheral 10 and some of these services to be accessed easily through the portable terminal 50.

Note that the portable terminal 50 according to the third embodiment receives the acquisition source URL from the multifunction peripheral 10 via the NFC interface 56 and receives the converted data from the service-providing apparatus 110 via the mobile communication interface 55. However, the method in which the portable terminal 50 receives converted data is not limited to the above example. For example, the following method may also be employed.

First, the control program 35 of the multifunction peripheral 10 may receive via the Wi-Fi communication interface 25 the converted data from the acquisition source specified in the acquisition source URL received in S130. Next, in S132 the control program 35 may transmit information required for establishing a Wi-Fi Direct connection (the SSID, for example) to the portable terminal 50 via the NFC interface 26. The portable terminal 50 sets the mobile communication interface 55 to a Wi-Fi Direct enabled state on the basis of the information transmitted from the control program 35 (the multifunction peripheral 10). In the Wi-Fi Direct enable state, the mobile communication interface 55 is capable of communicating with the multifunction peripheral 10. Next, the control program 35 may transmit the converted data to the portable terminal 50 according to Wi-Fi Direct once the Wi-Fi Direct connection has been established between the multifunction peripheral 10 and the portable terminal 50. The process of connecting the multifunction peripheral 10 and the portable terminal 50 through Wi-Fi Direct is an example of the connection process. The process in which the multifunction peripheral 10 transmits the converted data is an example of the data transmission process. The process in which the portable terminal 50 receives the converted data is an example of the data reception process.

At least part of the process shown in FIG. 15 may be executed in the process of S55 shown in FIG. 9 for performing the conversion service in the process shown in FIG. 9.

Part of the configuration implemented in hardware in the embodiments described above may be replaced by software and, conversely, part of the configuration of the invention implemented in software may be replaced by hardware.

Processes performed by the controllers of the present disclosure are achieved by executing corresponding programs stored in the program storage areas 32A, 62A, and 92A by the respective CPUs 31, 61, and 91 in the multifunction peripheral 10, the portable terminal 50, and the server 80. The configurations of the controllers are not limited to this. That is, at least part of each controller may be achieved by hardware, such as, Integrated Circuit (IC). Specifically, at least part of each controller may be achieved by may be a CPU, a plurality of CPUs, an Application Specific Integrated Circuit (ASIC), a plurality of ASICs, or any combination of these devices.

When all or part of the functions in the present disclosure are implemented by computer programs performed by the multifunction peripheral 10, the portable terminal 50, and the server 80, the programs can be stored on a non-transitory computer-readable storage medium. The programs may be used from the same storage medium on which they are provided (an example of a computer-readable storage medium), or may be first loaded onto a different storage medium (an example of a computer-readable storage medium). The "non-transitory computer-readable storage medium" may be a portable medium, such as a memory card, CD-ROM, or DVD-ROM; storages mounted in a server to which the multifunction peripheral 10, the portable terminal 50, or the server 80 can access, or an external storage device. The programs stored in the storage of the server may be provided as information or signals indicating the programs via the network such as the Internet.

What is claimed is:

1. An image processing apparatus comprising:
an image processor configured to form an image;
a communication interface configured to communicate with an intermediate server via the Internet;
a near field communication interface configured to perform wireless near field communication with a portable terminal according to a prescribed protocol; and
a controller configured to:
transmit service request information to the intermediate server via the communication interface, the service request information including request for a service provided by a service providing apparatus which is different from the intermediate server;

receive acquisition instruction information from the intermediate server via the communication interface, the acquisition instruction information including an instruction to acquire identification information via wireless near field communication, the identification information being used to receive the service; and receive the identification information from the portable terminal via the near field communication interface;

transmit the identification information to the intermediate server via the communication interface in response to reception of the identification information from the portable terminal via the near field communication interface;

when the request for a service is a request for a first service, receive first authentication information via the communication interface in response to the transmission of the identification information, the first authentication information being stored in association with the identification information in the intermediate server and for indicating that reception of the first service is authorized;

when the request for a service is a request for a second service, receive second authentication information via the communication interface in response to the transmission of the identification information, the second authentication information being stored in association with the identification information in the intermediate server and for indicating that reception of the second service is authorized;

receive the service from the service providing apparatus by using corresponding one of the received first authentication information and the received second authentication information; and generate image data by using the image processor.

2. The image processing apparatus according to claim 1, wherein the controller is further configured to receive error information from the intermediate server, the error information being transmitted from the intermediate server to the image processing apparatus when the identification information is not stored in the intermediate server, the error information being for indicating that reception of the service is not authorized.

3. The image processing apparatus according to claim 2, further comprising an operation interface,
wherein the controller is further configured to:
receive selection instruction information from the intermediate server via the communication interface;
receive a selection operation through the operation interface in response to reception of the selection instruction information, the selection operation designating one of services provided by the service providing apparatus, the services including the first service and the second service; and
transmit the service request information to the intermediate server via the communication interface, the service request information including service identification information being for identifying one of services selected in the selection operation.

4. The image processing apparatus according to claim 2, wherein the image processing apparatus further comprises an operation interface,
wherein the controller is further configured to:
receive selection instruction information from the intermediate server via the communication interface;
receive a selection operation through the operation interface in response to reception of the selection instruction information, the selection operation designating an account; and
transmit the service request information to the intermediate server via the communication interface, the service request information including account identification information being for indicating the account designated by the selection operation.

5. The image processing apparatus according to claim 1, wherein the image processor includes a printer,
wherein one of the first service and the second service includes a download service in which an image is received from the service providing apparatus via the communication interface so as to be printed by the printer.

6. The image processing apparatus according to claim 1, wherein the image processor includes a scanner,
wherein one of the first service and the second service includes an upload service in which an image scanned by the scanner is transmitted to the service providing apparatus from the communication interface.

7. An image processing apparatus comprising:
an image processor configured to form an image;
a communication interface configured to communicate with an intermediate server via the Internet;
a near field communication interface configured to perform wireless near field communication with a portable terminal according to a prescribed protocol; and
a controller configured to:
transmit service request information to the intermediate server via the communication interface, the service request information including request for a service provided by a service providing apparatus which is different from the intermediate server;
receive acquisition instruction information from the intermediate server via the communication interface, the acquisition instruction information including an instruction to acquire identification information via wireless near field communication, the identification information being used to receive the service; and
receive the identification information from the portable terminal via the near field communication interface;
transmit the identification information to the intermediate server via the communication interface in response to reception of the identification information from the portable terminal via the near field communication interface;
receive authentication information via the communication interface in response to the transmission of the identification information, the authentication information being stored in association with the identification information in the intermediate server and for indicating that reception of the service is authorized;
receive the service from the service providing apparatus by using the received authentication information; and
generate image data by using the image processor,
wherein the controller is further configured to receive error information from the intermediate server, the error information being transmitted from the intermediate server to the image processing apparatus when the identification information is not stored in the intermediate server, the error information being for indicating that reception of the service is not authorized.

8. A non-transitory computer-readable recording medium storing computer-readable instructions for an image processing apparatus, wherein the image processing apparatus includes: an image processor configured to form an image; a communication interface configured to communicate with an intermediate server via the Internet; and a near field communication interface configured to perform wireless near field communication with a portable terminal according to a prescribed protocol, wherein the computer-readable instructions, when executed by a processor of the image processing apparatus, cause the image processing apparatus to:

transmit service request information to the intermediate server via the communication interface, the service request information including request for a service provided by a service providing apparatus which is different from the intermediate server;

receive acquisition instruction information from the intermediate server via the communication interface, the acquisition instruction information including an instruction to acquire identification information via wireless near field communication, the identification information being used to receive the service; and receive the identification information from the portable terminal via the near field communication interface;

transmit the identification information to the intermediate server via the communication interface in response to reception of the identification information from the portable terminal via the near field communication interface;

receive authentication information via the communication interface in response to the transmission of the identification information, the authentication information being stored in association with the identification information in the intermediate server and for indicating that reception of the service is authorized;

receive the service from the service providing apparatus by using the received authentication information;

generate image data by using the image processor; and receive error information from the intermediate server, the error information being transmitted from the intermediate server to the image processing apparatus when the identification information is not stored in the intermediate server, the error information being for indicating that reception of the service is not authorized.

\* \* \* \* \*

UNITED STATES PATENT AND TRADEMARK OFFICE
CERTIFICATE OF CORRECTION

PATENT NO. : 10,097,730 B2
APPLICATION NO. : 15/635916
DATED : October 9, 2018
INVENTOR(S) : Ken Saito Page 1 of 1

It is certified that error appears in the above-identified patent and that said Letters Patent is hereby corrected as shown below:

On the Title Page

Related U.S. Application Data should read:
(63) Continuation of application of U.S. application serial no. 15/052,930 filed on February 25, 2016, now U.S. Patent 9,706,065.

Signed and Sealed this
Eleventh Day of December, 2018

Andrei Iancu
*Director of the United States Patent and Trademark Office*